United States Patent [19]

Giger et al.

[11] Patent Number: 5,657,362
[45] Date of Patent: Aug. 12, 1997

[54] AUTOMATED METHOD AND SYSTEM FOR COMPUTERIZED DETECTION OF MASSES AND PARENCHYMAL DISTORTIONS IN MEDICAL IMAGES

[75] Inventors: Maryellen L. Giger, Elmhurst; Ming Zhang; Ping Lu, both of Chicago, all of Ill.

[73] Assignee: Arch Development Corporation, Chicago, Ill.

[21] Appl. No.: 393,779

[22] Filed: Feb. 24, 1995

[51] Int. Cl.$^6$ ........................ A61B 6/04
[52] U.S. Cl. ........................ 378/37; 382/171
[58] Field of Search ............ 364/413.13, 413.23; 378/98.7, 37, 901; 382/130, 132, 171, 173

[56] References Cited

U.S. PATENT DOCUMENTS

| | | | |
|---|---|---|---|
| 4,907,156 | 3/1990 | Doi et al. | 364/413.13 |
| 5,133,020 | 7/1992 | Giger et al. | |
| 5,260,871 | 11/1993 | Goldberg | 364/413.02 |
| 5,452,367 | 9/1995 | Bick et al. | 382/128 |

OTHER PUBLICATIONS

U.S. application No. 07/915,631, Nishikawa et al., filed Jul. 21, 1992.
U.S. application No. 08/159,133, Giger et al., filed Nov. 30, 1993.
U.S. application No. 08/159,136, Giger et al., filed Nov. 30, 1993.
U.S. application No. 08/158,389, Giger et al., filed Nov. 29, 1993.
U.S. application No. 08/158,320, Bick et al., filed Nov. 29, 1993.
U.S. application No. 08/158,388, Giger et al., filed Nov. 29, 1993.
U.S. application No. 08/220,917, Giger et al., filed Mar. 31, 1994.
U.S. application No. 08/393,779, Giger et al., filed Feb. 24, 1995.
U.S. application No. 08/398,307, Bick et al., filed Mar. 3, 1995.

*Primary Examiner*—David P. Porta
*Assistant Examiner*—David Vernon Bruce
*Attorney, Agent, or Firm*—Oblon, Spivak, McClelland, Maier & Neustadt, P.C.

[57] ABSTRACT

A method and system for the automated detection of lesions such as masses and/or tissue (parenchymal) distortions in medical images such as mammograms. Dense regions and subcutaneous fat regions within a mammogram are segmented. A background correction may be performed within the dense regions. Hough spectrum within ROIs placed in the breast region of a mammogram are calculated and thresholded using the intensity value η in order to increase sensitivity and reduce the number of false-positive detections. Lesions are detected based on the thresholded Hough spectra. The thresholded Hough spectra are also used to differentiate between benign and malignant masses.

44 Claims, 31 Drawing Sheets

AUTOMATED METHOD AND SYSTEM FOR COMPUTERIZED DETECTION OF MASSES AND PARENCHYMAL DISTORTIONS IN MEDICAL IMAGES

BACKGROUND OF THE INVENTION

1. Field of the Invention

The present invention relates generally to a method and system for an improved computerized, automatic detection and characterization of lesions such as masses and parenchymal distortions in images. In particular the present invention relates to a method and system for the detection of lesions such as masses and parenchymal distortions including segmentation of dense regions within mammograms, calculations regarding percent dense, correction for the dense portions, and analysis based on the Hough spectrum. The detection of the mass and/or parenchymal distortion leads to a localization of a suspicious region and the characterization leads to a likelihood of cancer.

2. Discussion of the Background

Although mammography is currently the best method for the detection of breast cancer, between 10–30% of women who have breast cancer and undergo mammography have negative mammograms. In approximately two-thirds of these false-negative mammograms, the radiologist failed to detect the cancer that was evident retrospectively. The missed detections may be due to the subtle nature of the radiographic findings (i.e., low conspicuity of the lesion), poor image quality, eye fatigue or oversight by the radiologists. In addition, it has been suggested that double reading (by two radiologists) may increase sensitivity. It is apparent that the efficiency and effectiveness of screening procedures could be increased by using a computer system, as a "second opinion or second reading," to aid the radiologist by indicating locations of suspicious abnormalities in mammograms. In addition, mammography is becoming a high volume x-ray procedure routinely interpreted by radiologists.

If a suspicious region is detected by a radiologist, he or she must then visually extract various radiographic characteristics. Using these features, the radiologist then decides if the abnormality is likely to be malignant or benign, and what course of action should be recommended (i.e., return to screening, return for follow-up or return for biopsy). Many patients are referred for surgical biopsy on the basis of a radiographically detected lesion or cluster of microcalcifications. Although general rules for the differentiation between benign and malignant breast lesions exist, considerable misclassification of lesions occurs with current radiographic techniques. On average, only 10–20% of masses referred for surgical breast biopsy are actually malignant. Thus, another aim of computer use is to extract and analyze the characteristics of benign and malignant lesions in an objective manner in order to aid the radiologist by reducing the numbers of false-positive diagnoses of malignancies, thereby decreasing patient morbidity as well as the number of surgical biopsies performed and their associated complications.

SUMMARY OF THE INVENTION

Accordingly, an object of this invention is to provide a method and system for detecting, classifying, and displaying lesions such as masses and tissue distortions in medical images such as images of the breast.

Another object of this invention is to provide an automated method and system for the detection and/or classification of lesions such as masses and architectural distortions based on Hough-spectrum analysis and improved thresholding (segmenting) of the Hough-spectrum data.

A further object of this invention is to provide an automated method and system for the segmentation of the dense portion of the breast within the mammogram in order to determine the percent dense and related indices as well as for use in subsequent image processing for human vision and computer vision.

A still further object of this invention is to provide an automated method and system for the segmentation of subcutaneous fat within the mammogram.

Another object of this invention is to provide an automated method and system for the background correction within the dense portions of the mammograms in order to enhance the detectability of lesions within dense portions.

Still another object of this invention is to provide an automated method and system for the segmentation of suspicious lesions by producing a difference image of the original image and the fatty tissue in order to simulate bilateral subtraction method.

These and other objects are achieved according to the invention by providing a new and improved automated method and system in which a segmentation of the dense regions and the subcutaneous fat regions within a mammogram is performed, followed by an option for correction within the dense portion and/or in which an analysis and detection for spiculated lesions and/or parenchymal distortions is performed.

BRIEF DESCRIPTION OF THE DRAWINGS

A more complete appreciation of the invention and many of the attendant advantages thereof will be readily obtained as the same becomes better understood by the reference to the following detailed description when considered in connection with the accompanying drawings, wherein:

FIGS. 11A and 11B show histograms illustrating the distribution of dense breast in a database of 740 mammograms as determined by a radiologist and by a computer, respectively;

DETAILED DESCRIPTION OF THE PREFERRED EMBODIMENTS

Figure 1:
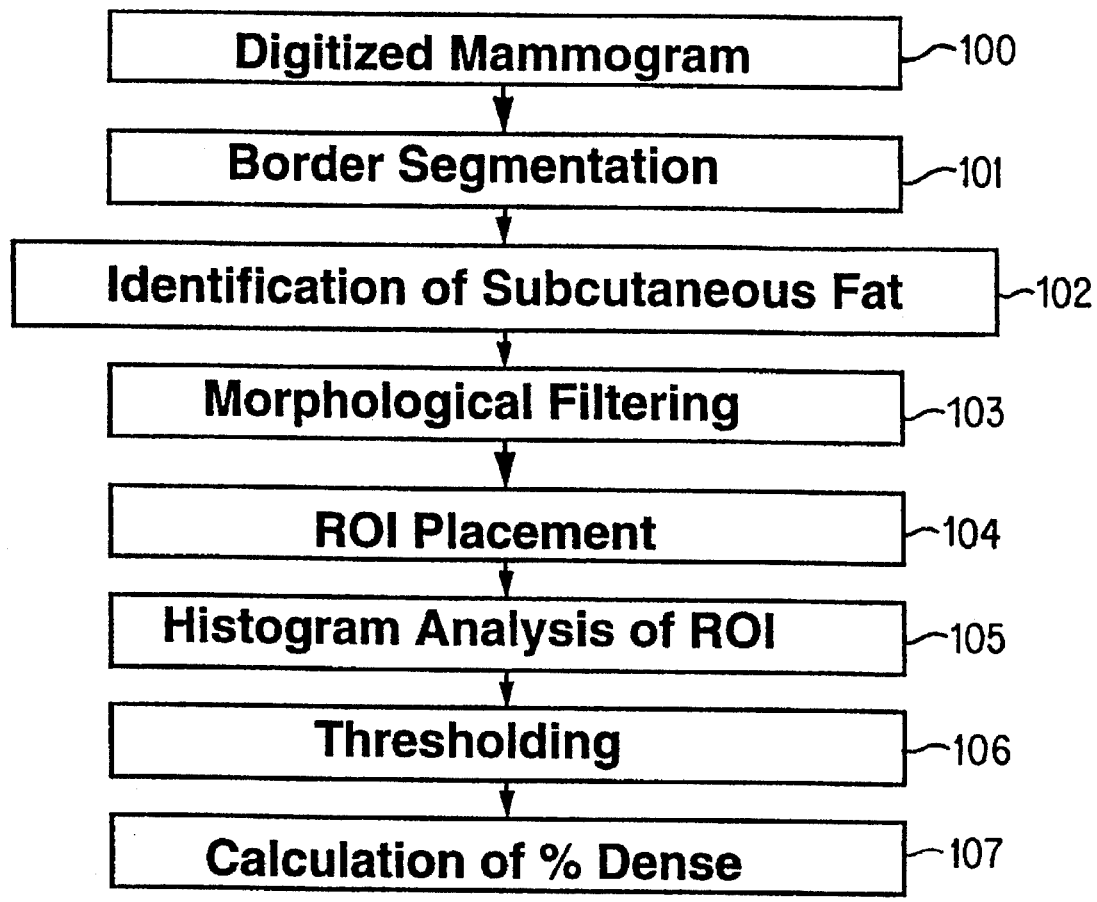
FIG. 1 is a schematic diagram illustrating the automated method for the segmentation of dense portions within mammograms according to the invention.

Referring now to the drawings, and more particularly to FIG. 1 thereof, a schematic diagram of the automated method for the detection and classification of lesions in breast images is shown. The overall scheme includes an initial acquisition of a pair of mammograms and digitization (step 100). Next the breast border is segmented from the rest of the image area (step 101) and regions of subcutaneous fat are identified (step 102). Morphological filtering is performed (step 103), ROIs (regions of interest) are placed along the chest wall (step 104) and a histogram analysis is preformed both within the entire image area as well as just within the ROI (step 105). Using the determined threshold value from the histogram analysis, the image is threshold to yield the dense portions (step 106) and the percentage dense is calculated (step 107).

Mammograms are obtained using conventional radiographic techniques. The mammograms are digitized, for example, by using a laser scanner. The digital image is typically of 2048 pixels by 2500 pixels, where the pixel size is 0.1 mm. Mammograms are subsampled or averaged to obtain an effective pixel size of 0.5 mm resulting in a 512×512 image.

Segmentation of the breast border (step 101) can be carried out as described in application Ser. No. 08/158,320 to Bick et al, the disclosure of which is incorporated herein by reference. The segmentation scheme identifies the pixels in the image corresponding to the border of the breast and thus identifies the pixels corresponding to the breast region.

Figure 2:
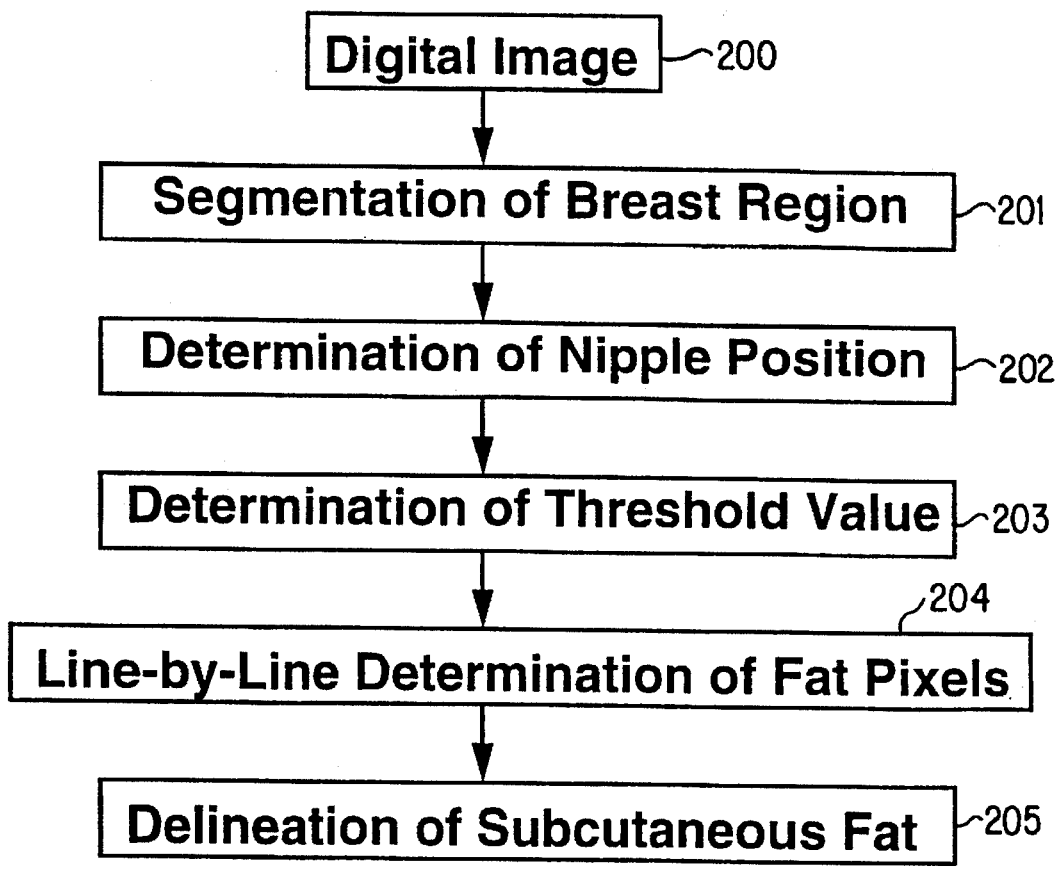
FIG. 2 is a schematic diagram illustrating the automated method for the segmentation of the subcutaneous fat within mammograms according to the invention.

Next, subcutaneous fat is identified in step 102. FIG. 2 is a schematic diagram illustrating the automated method for the segmentation of the subcutaneous fat within mammograms according to the invention. After the image is in digital form (step 200) and the breast region has been segmented (step 201), the nipple position is determined (step 202). The nipple position can be determined from analyzing the internal and external breast skinlines, as described in application Ser. No. 08/158,320. The starting point in the image for the identification of the subcutaneous fat is the nipple position on the breast border. A gray-level threshold value is then determined (step 203) as described below with respect to FIGS. 4A and 4B. The pixels on the same row are excluded from the breast region if their pixel value is less than the threshold (i.e., 450 on a 10-bit scale) and the distance (in x direction) to the starting pixel is less than a maximum offset (offset is usually 40 pixels for a 0.5 mm pixel size, which was empirically determined). These excluded pixels are considered as the subcutaneous fat. On the next row, the starting pixel is from the breast border. The pixel on this row is excluded from the breast region if the corresponding pixel value is less than the threshold value—the ending pixel on this row has to be within a set number of pixels, for example 7, from the previous row's ending pixel (width is currently 7 pixels for 0.5 mm pixels, which was empirically determined). The process is repeated until the bottom (or top) of the breast is reached. The process is repeated for the remaining top (or bottom) portion of the breast. All the pixels that are excluded are considered to be part of the subcutaneous fat portion of the breast region.

The image with the excluded pixels is subject to morphological filtering in step 103 (FIG. 1). Morphological filtering is described in, for example, "The Image Processing Handbook," 2nd Ed., by John Russ (CRC Press 1995). The filtering reduces isolated pixels.

Figure 3A:
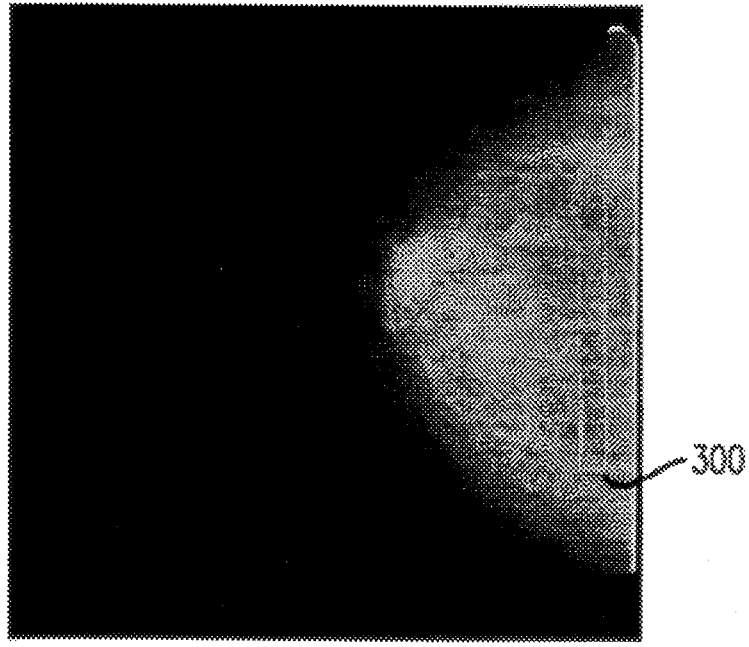
FIGS. 3A and 3B are diagrams illustrating the positioning of the region of interest (ROI) within the breast region.
Figure 3B:
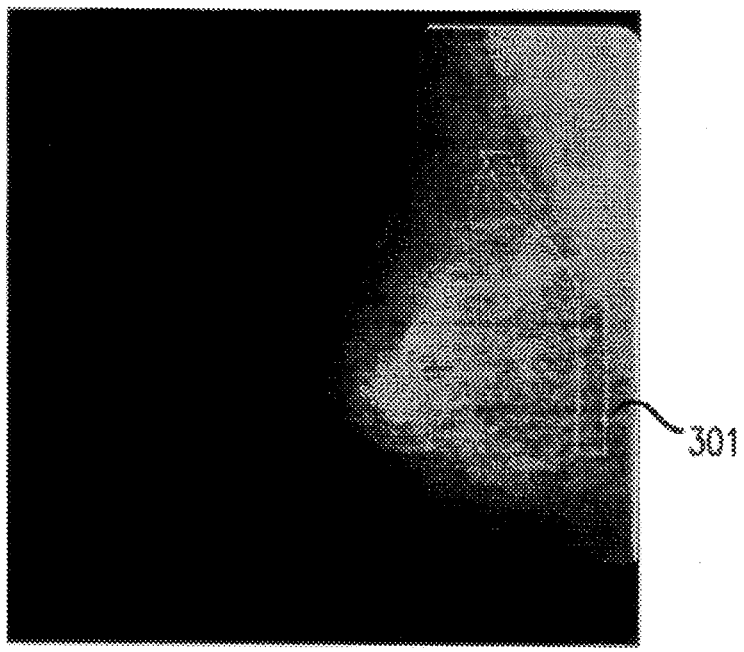

FIGS. 3A AND 3B are diagrams illustrating the positioning of the region of interest (ROI) within the breast region. An ROI, of predetermined width and height is positioned at a predetermined distance (mm or pixels) from the chest wall, as shown by ROIs 300 and 301. The location of the chest wall side in the mammogram is determined during the breast segmentation step since it differs greatly from the external side of the breast. ROI 300 is approximately rectangular since it follows the vertical chest wall (or breast border edge) of the breast view of FIG. 3A, while ROI 301 bends as it follows the chest wall.

Figure 4A:
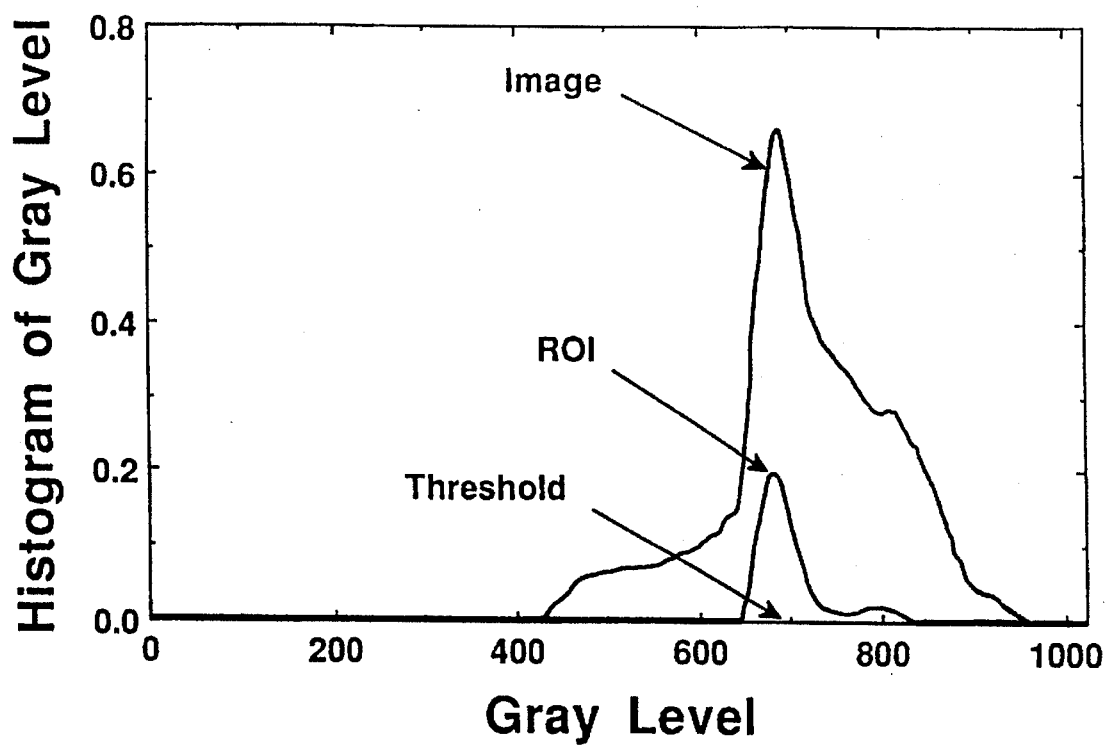
FIGS. 4A and 4B are graphs illustrating the gray level histogram within the breast region and within the ROI of FIG. 3, respectively.
Figure 4B:
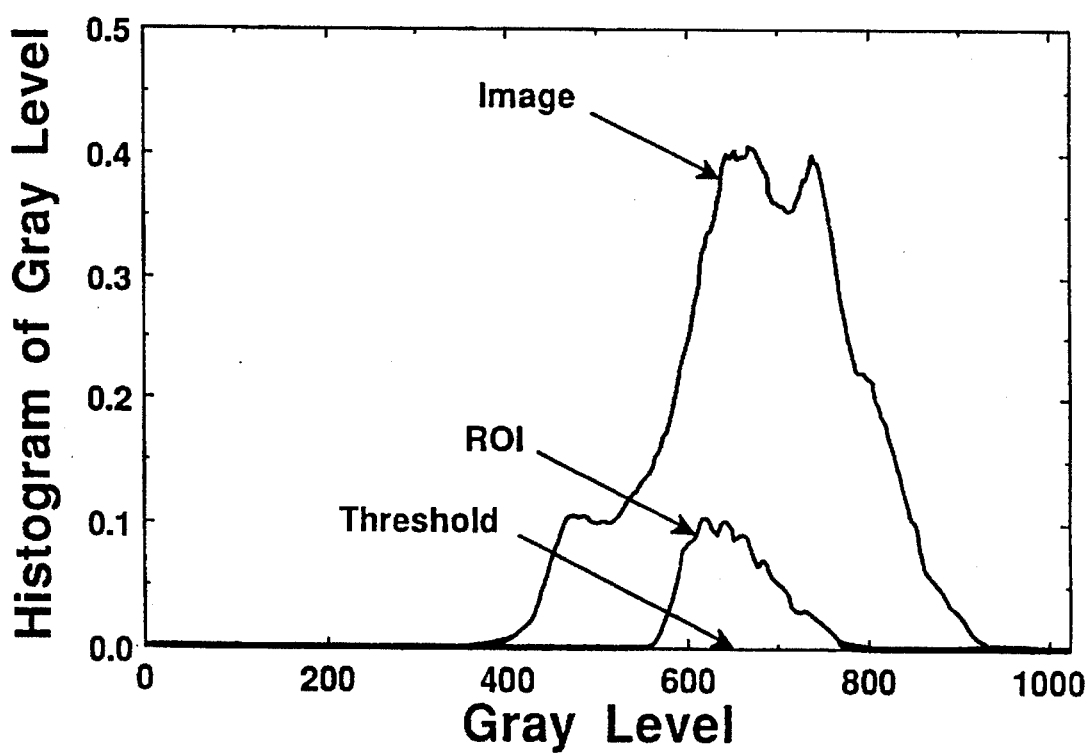

FIGS. 4A and 4B are graphs illustrating the gray level histogram (4A) within the breast region and (4B) within the ROI of FIG. 3A. The graph indicates the located peaks used in determining the threshold level. Gray level histograms are calculated within the breast region as well as within the ROI for a given mammogram. For the digitizer used in this study, high pixel values (gray levels) correspond to low optical density. Dense "anatomical" portions of the breast are "white" on the mammogram, which correspond to area of low optical density. Thus, in the histograms shown for within the breast region, the distribution is due to the presence of both fatty (high optical density and low pixel value) and dense (low optical density and high pixel value) portions in the breast. Typically, breast tend to be dense in the external portions and fatty near the chest wall. Thus, the ROI near the chest wall, as compared to that of the entire breast regions can be used to indicate the gray levels of the fatty portions.

Figure 5A:
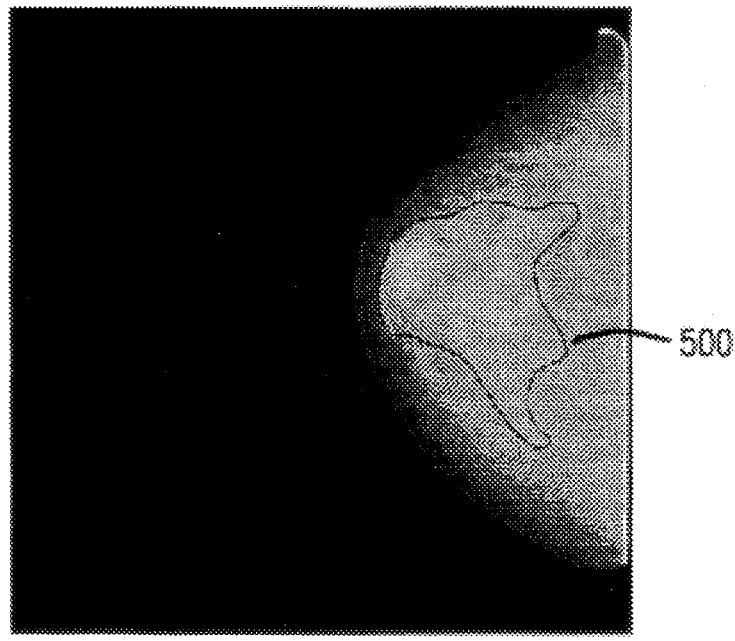
FIGS. 5A and 5B are diagrams illustrating the breast images of FIGS. 3A and 3B, respectively, after thresholding with the dense portions indicated.
Figure 5B:
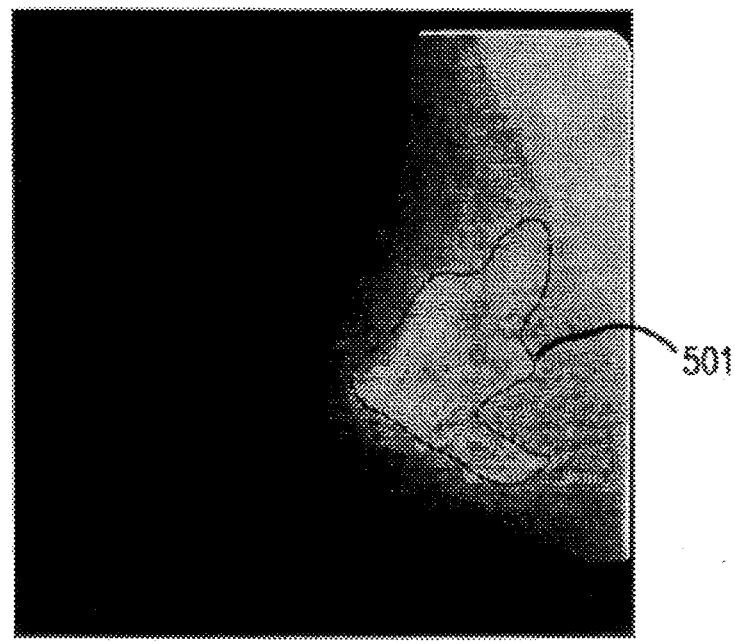

FIGS. 5A and 5B are diagrams illustrating the breast image after gray-level thresholding with the dense portions being indicated as the regions 500 and 501. Note that the white area corresponding to the dense regions remain. In addition, it should be noted that by subtracting the gray level that corresponds to the cutoff for the fatty tissue from the entire image, one can increase the visibility of lesions. The result is similar to that obtained with bilateral subtraction in that the number of false positives due to fat will be reduced. For a discussion of the bilateral subtraction technique, see U.S. Pat. No. 5,133,020 to Giger et al, the disclosure of which is herein incorporated by reference. The subtracted image can then be subjected to similar thresholding and feature extraction techniques as performed on a bilateral subtracted image.

Figure 6A:
FIGS. 6A–6D show the images of FIGS. 3A and 3B after subtraction of the gray level corresponding to fat in the breast with texture (6A and 6C) and in binary form (6B and 6D), respectively.
Figure 6B:
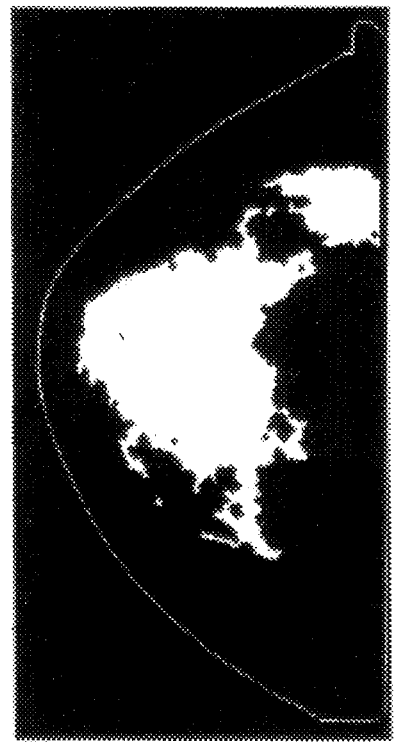
Figure 6C:
Figure 6D:

FIGS. 6A–6D illustrate the subtraction of the fat pixels. FIG. 6A corresponds to the original image shown in FIG. 3A after subtraction of the gray level corresponding to fat. FIG. 6B is a binary image of FIG. 6A. FIG. 6C corresponds to the original image shown in FIG. 3B after subtraction of the gray level corresponding to fat. FIG. 6D is a binary image of FIG. 6C. Note that the small isolated pixels can be removed by processing, e.g., with a morphological open operation. This subtraction process can be performed in terms of gray level or in terms of relative x-ray exposure (by use of the characteristic curve of the imaging system). After subtraction of the fatty level, the image can now be processed by the multi-gray-level thresholding and the feature analysis stages of the bilateral subtraction method. Multi-gray-level thresholding and feature analysis techniques are described in application Ser. No. 08/158,389 to Giger et al, the disclosure of which is herein incorporated by reference.

Figure 7:
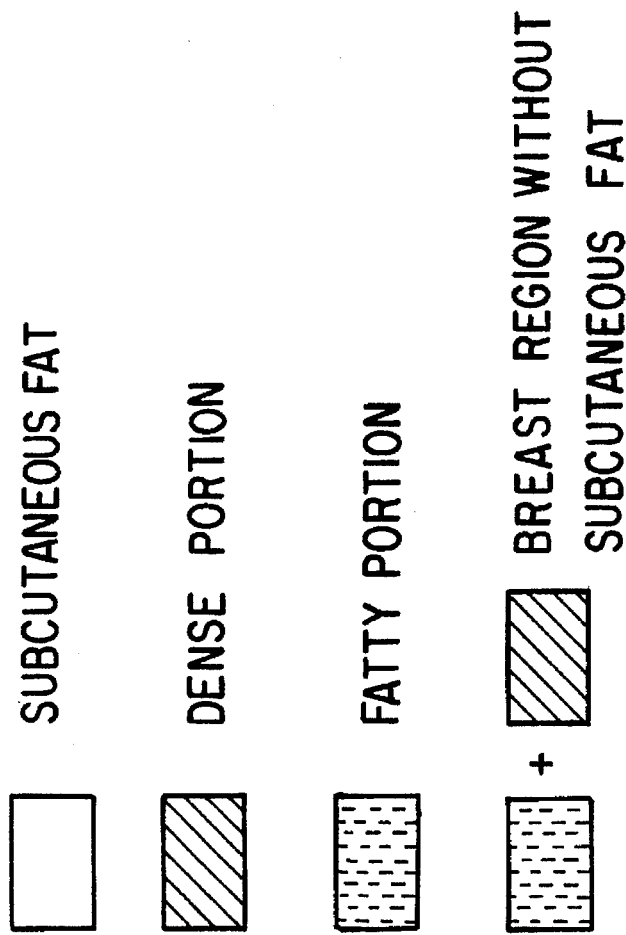
FIG. 7 is a diagram illustrating the method for determining the percent dense.
Figure 7:
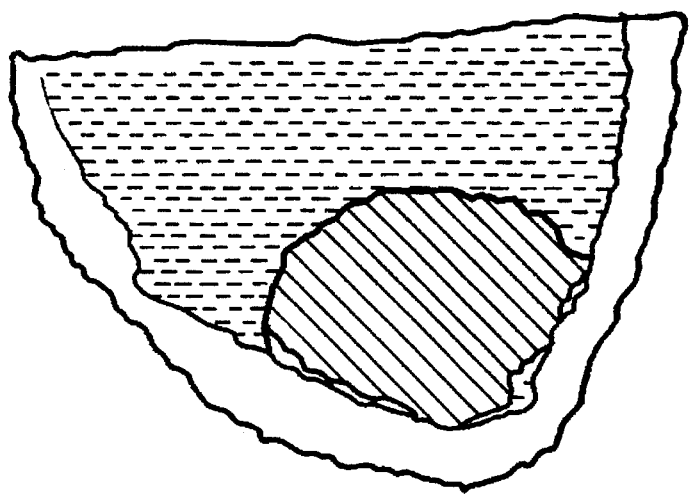

FIG. 7 is a diagram illustrating the method for determining the percent dense. The percent dense is calculated from the ratio of the number of pixels within the dense portion (above threshold) to the number of pixels within the breast region (exclusive of the subcutaneous fat regions). The percent dense is a useful measure to radiologists used to categorize and interpret radiographic breast images and is useful in computer vision techniques.

Figure 8:
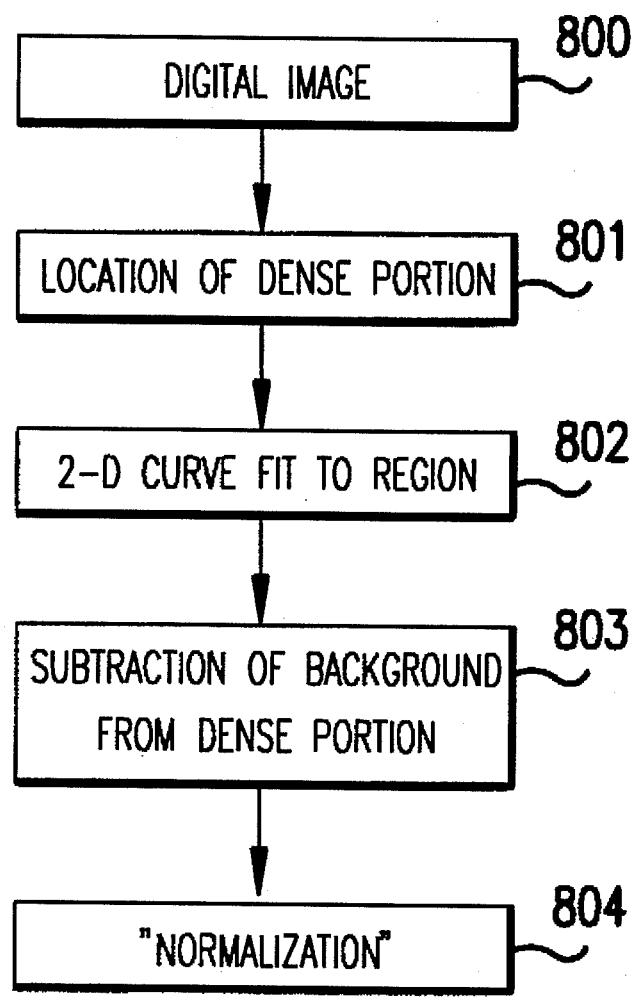
FIG. 8 is a diagram illustrating the method for correction of the dense portion within mammograms.

FIG. 8 is a diagram illustrating the method for correction of the dense portion within mammograms. Dense portions tend to reside near the nipple and skin region, whereas fatty regions usually can be found along the chest wall in the breast region. By analysis of the histograms, a peak will be located corresponding to the dense region cutoff. The two peaks are used to determine a threshold for fatty and dense pixels. First, a digital mammographic image is obtained (step 800) and the dense portion is located (step 801), as described above. Gray-level thresholding will be performed and if the breast is sufficiently dense, background trend correction will be performed within the dense region. For example, a sufficient measure for the percent dense could be 40%. This procedure tends to make the breast "fatty-like" with a more uniform background (in terms of denseness). Background trend correction is performed using a 2-dimensional surface fit in which pixels below the threshold (i.e., fatty) are not included in determining the fit (step 802). The 2-D fit is then subtracted from the dense regions (step 803).

Figure 9A:
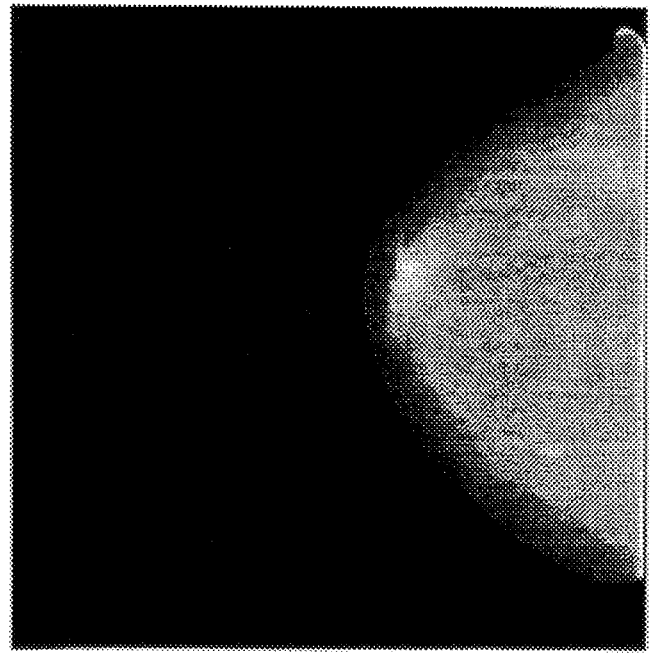
FIGS. 9A and 9B are diagrams illustrating the breast images after dense-portion correction of the images in FIGS. 3A and 3B, respectively.
Figure 9B:
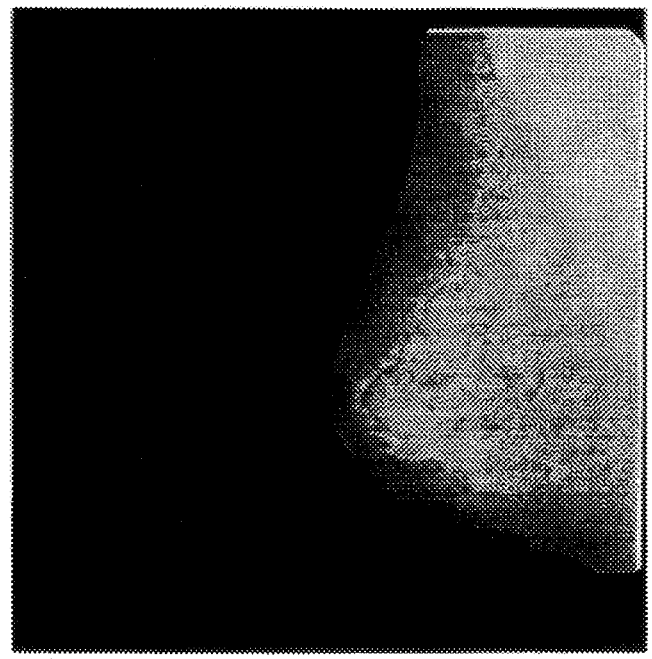

Subtracting the background trend alters average gray value of the resulting image. It is desirable to match the gray-value of the resulting image to the average gray level of the original image. The resulting image is normalized to match the average gray level of the original image (step 804). Also the edge of the dense region can be matched to the entire region to reduce edge artifacts. The edge of the dense region is slightly evident in FIG. 9B. After normalization the dense portion has been corrected FIGS. 9A and 9B are diagrams illustrating the breast images after dense-portion correction of the images of FIGS. 3A and 3B, respectively. Note that the density of the breast is more uniform due to the correction.

Figure 10A:
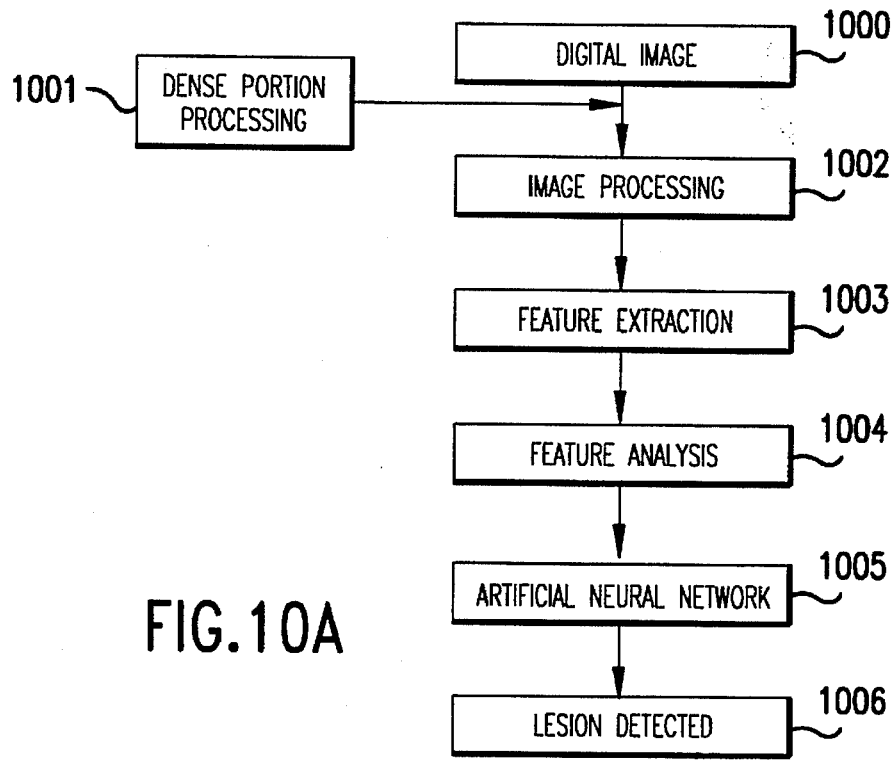
FIGS. 10A and 10B are diagrams illustrating the incorporation of the dense-portion correction into a lesion detection scheme at the preprocessing image-enhancement stage and at the feature extraction stage, respectively.
Figure 10B:
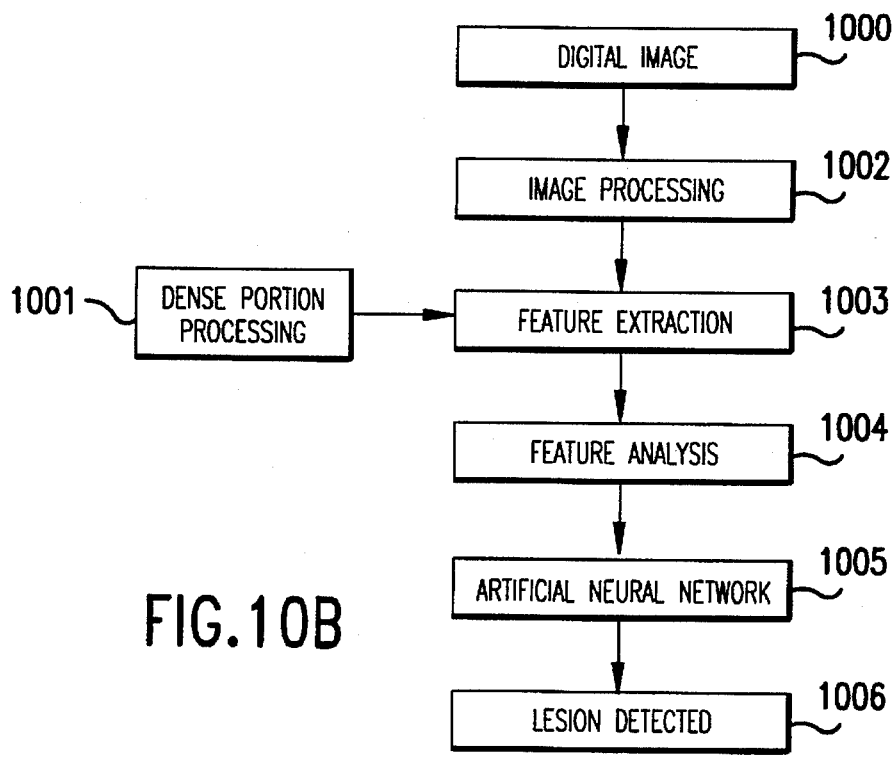

Diagrams illustrating the incorporation of the dense-portion correction into a mass detection scheme at the preprocessing image-enhancement stage and at the feature extraction stage are shown in FIGS. 10A and 10B, respectively. In FIG. 10A a digital image is obtained (step 1000) and dense portion processing may be performed (step 1001). At the this point, the dense-portion correction serves to increase the conspicuity of the lesion and increase detection sensitivity. Image processing consists of techniques used to increase the signal-to-noise ratio of image such as bilateral subtraction. After the image is processed, features of the image are extracted (step 1003) such as is described in application Ser. No. 08/158,359. Features extracted can be geometric-based features such as circularity, size, irregularity and compactness; intensity-based features such as contrast, average pixel value, standard deviation of the pixel value and the ratio of the average to the standard deviation; and gradient-based measures such as average gradient and the standard deviation of the gradient. The extracted features (see FIG. 12A, for example, which lists features that may be extracted) are input to a detection scheme such as an artificial neural network (step 1004) that has been trained to diagnose and detect possible lesions. The network outputs an indication of the location in the image of possible lesions (step 1005). This procedure is also described in Ser. No. 08/158,359.

The method shown in FIG. 10B differs from that of FIG. 10A in that the dense portion processing (step 1001) is performed at step 1003 of feature extraction. The dense processing at this point is designed to reduce the number of false positive detections in the image. Features are extracted from the image after it has been processed and dense portion corrected. At the feature extraction stage, the dense-portion correction serves to yield improved region growing and extraction from the parenchymal background.

It is also possible to use dense processing at both the image processing stage and at the feature extraction phase.

Figure 11B:
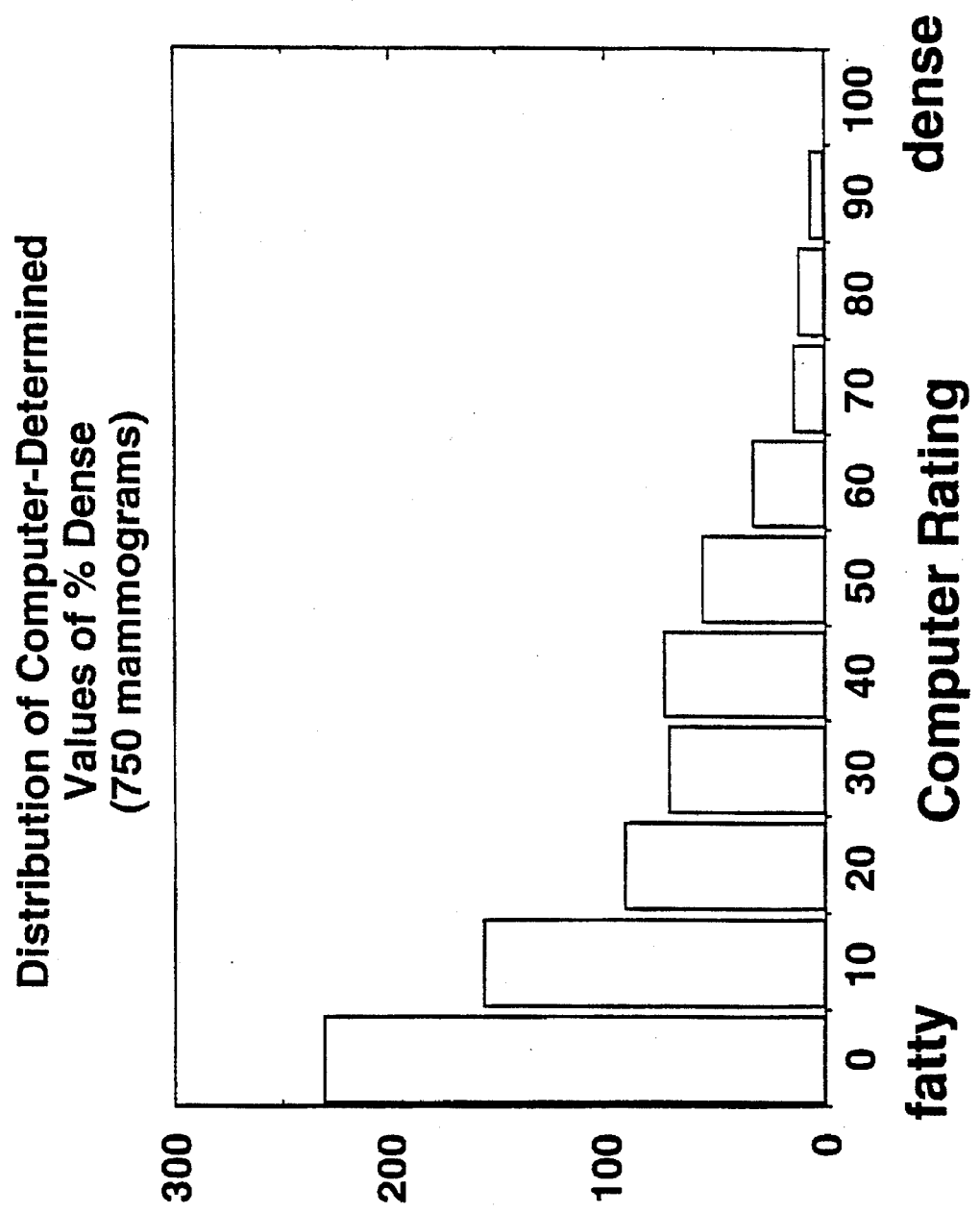

FIGS. 11A and 11B show histograms illustrating the distribution of dense breast in a database of 740 mammograms as determined by a radiologist and by the computer, respectively. It was found that the ratings by the computer and those from the radiologist had good correlation at a statistically significant level.

Figure 12A:
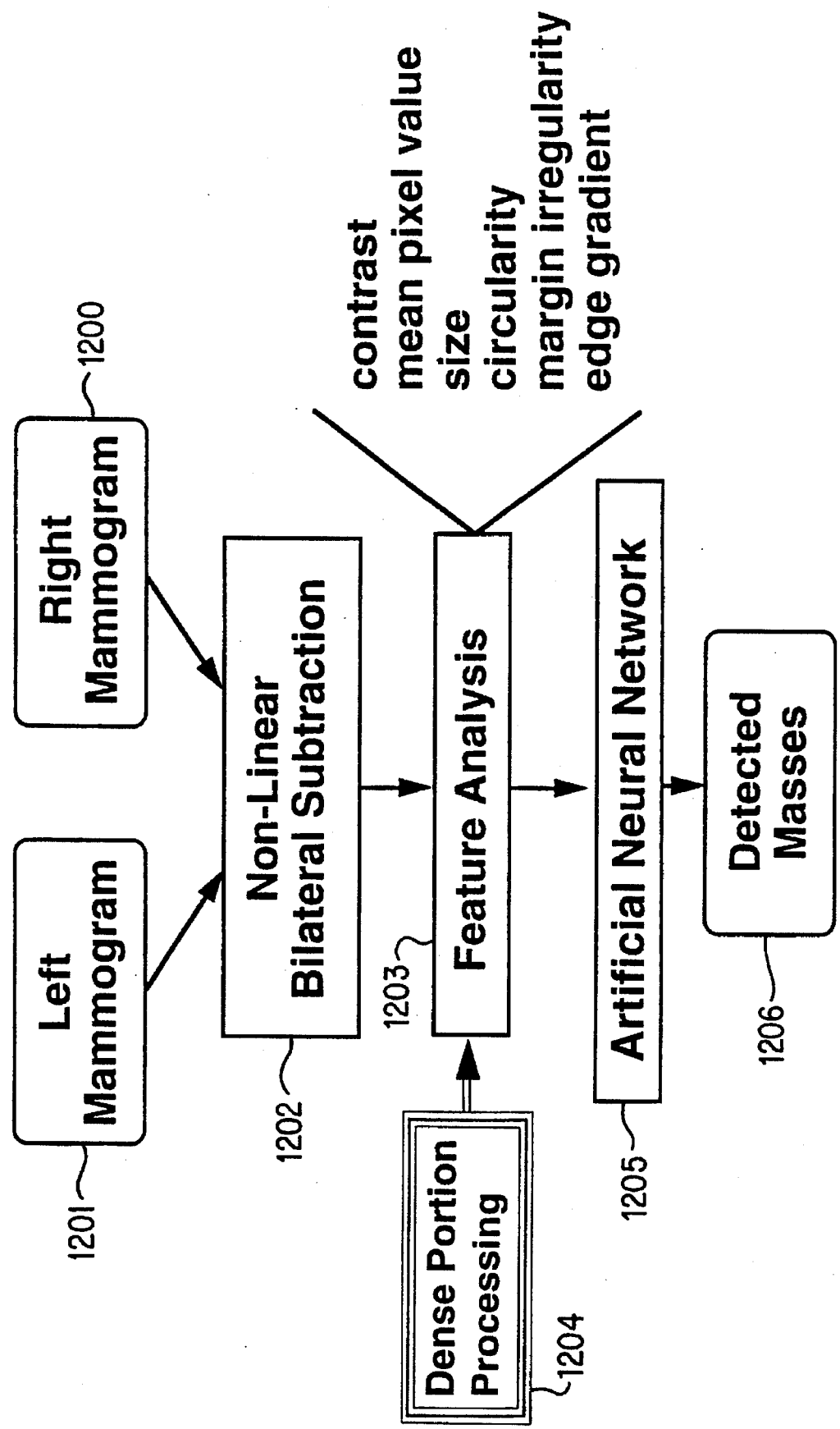
FIGS. 12A–12C are schematics illustrating the use of dense portion correction in a dual mammogram computerized detection scheme, in feature analysis of potential lesions, and in a single mammogram computerized detection scheme, respectively.
Figure 12A:
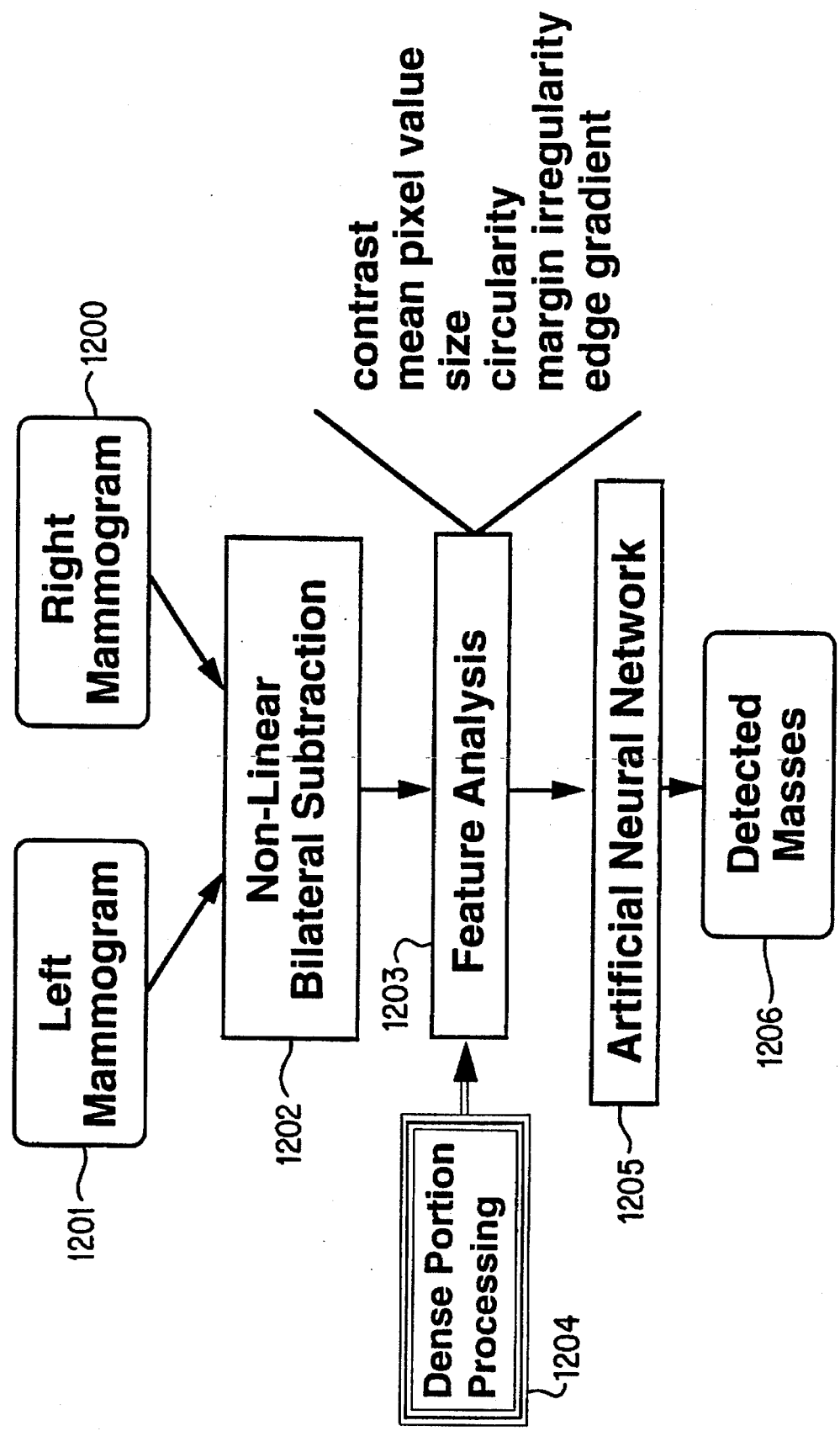
Figure 12B:
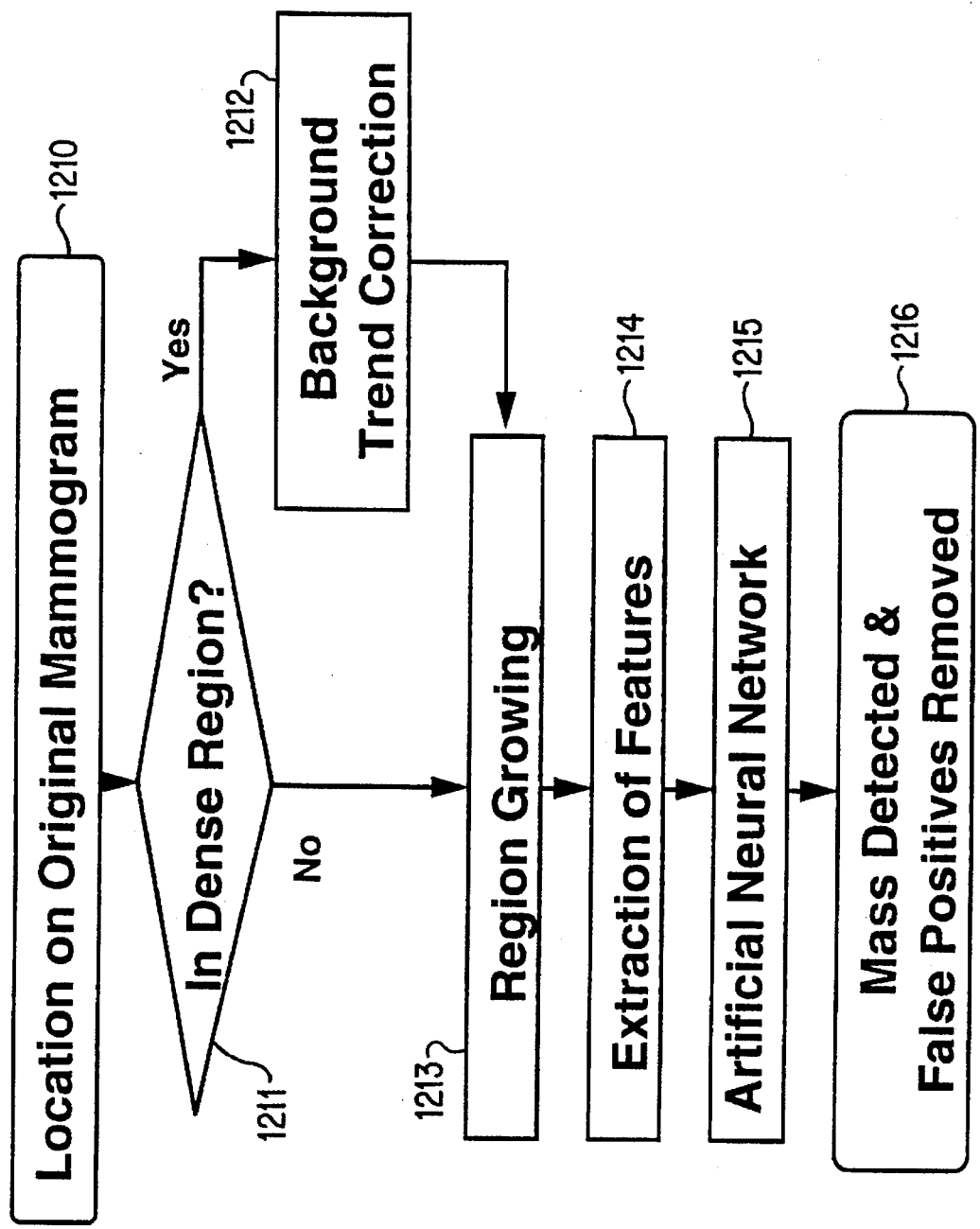
Figure 12C:
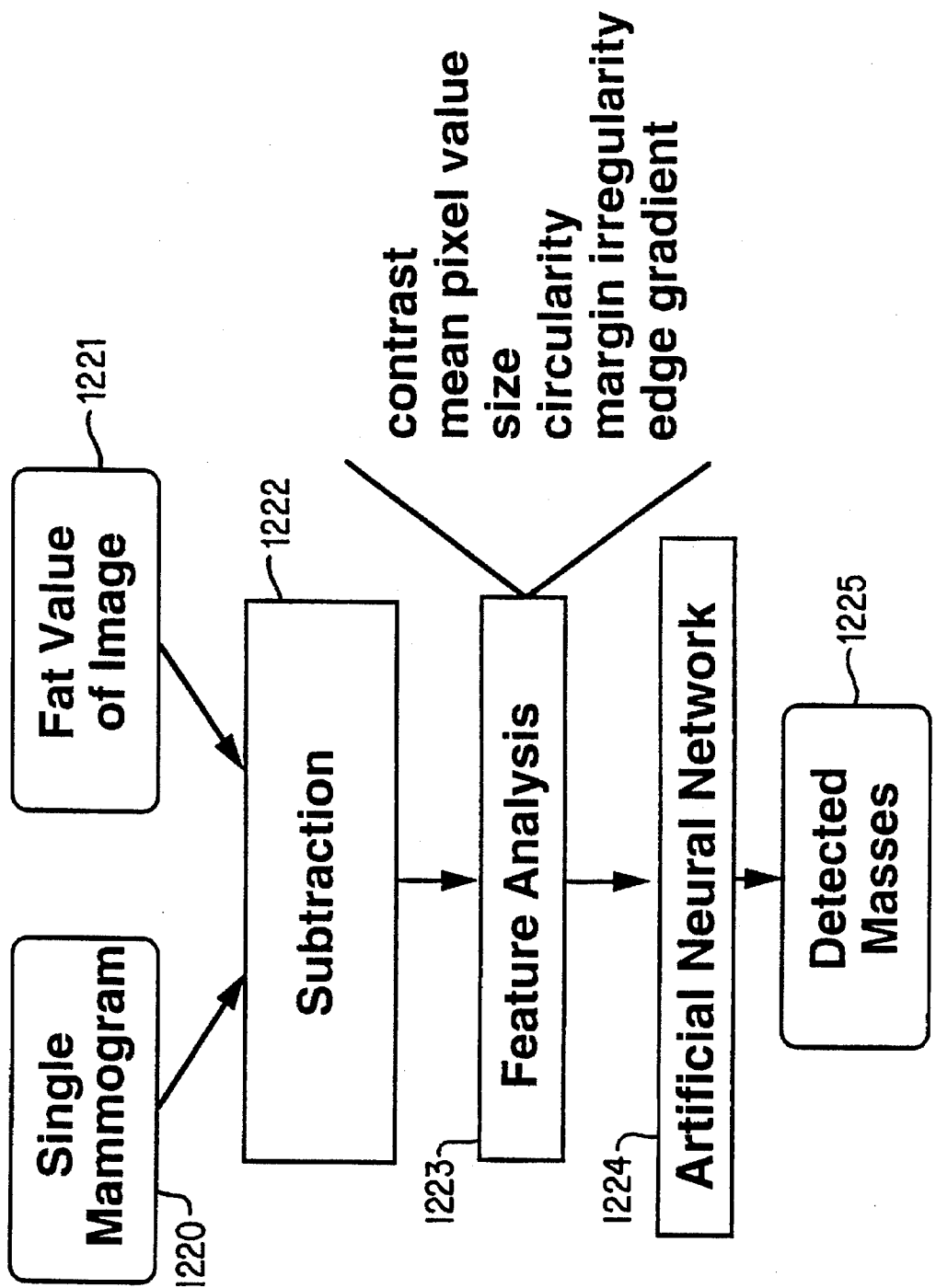

The use of dense portion correction in a computer-aided mass detection scheme is illustrated in FIGS. 12A–12C. FIG. 12A shows a dual mammographic analysis scheme where right and left mammograms are obtained (steps 1200 and 1201) which are bilaterally subtracted (step 1202) to produce a bilaterally subtracted image. Bilateral subtraction is described, for example, in U.S. Pat. No. 5,133,020. Feature extraction (step 1203) is carried out using the subtracted image. As described with respect to FIG. 10B, the dense portion processing (step 1204) is carried out at the point of feature extraction. The extracted features are input to a detection scheme such as an artificial neural network (step 1205) trained to detect masses (similar to that shown in FIGS. 10A and 10B). Other detection schemes such as an expert system or a rule based system could also be used. The artificial neural network provides an indication in the image of the detected masses (step 1206).

Dense portion analysis can also be applied to feature analysis of potential lesions. A method of feature analysis of potential lesions in a mammogram is shown in FIG. 12B. FIG. 12B is a detailed diagram of steps 1203–1206 of FIG. 12A. In step 1210 a location of a potential in a mammogram is obtained. Lesion identification in mammograms can be performed in a number of ways, such as nonlinear bilateral subtraction. Next, it is determined whether the location is located in the dense portion (step 1211). If yes, background trend correction is performed at step 1212 (as described above with respect to FIG. 8) and the method proceeds to a step 1213 of region growing. If no, the method proceeds directly to step 1213. After region growing, features of the grown region are extracted (step 1214) and input to an artificial neural network (step 1215). The network detects masses and removes some false positives (step 1216). Region growing and the extraction of features from the grown region are also described in Ser. No. 08/158,359.

In the correction for the dense portion, the pixel values within the dense portions of the breast region are fitted, such as with a polynomial function. The fit is then subtracted the dense portions of the breast region. This was performed during feature analysis in order to improve the region growing used in the computerized extraction of the lesion from the parenchymal background (step 1213). This technique results in a reduction of false positive detections in the bilateral subtraction mass detection scheme.

FIG. 12C shows a computerized detection scheme using only a single mammogram. In steps 1220 and 1221, a single mammogram and a fat value of the mammogram are obtained. The fat value is determined as described above with respect to FIGS. 6A–6D where the pixel value corresponding to the cutoff for the fatty tissue is subtracted from the mammogram (step 1222). Suspect lesion, feature extraction and feature analysis, inputting the features to a detection scheme such as a trained artificial neural network, and detecting masses (steps 1223–1225) are then performed (see Ser. No. 08/158,389).

Figure 13:
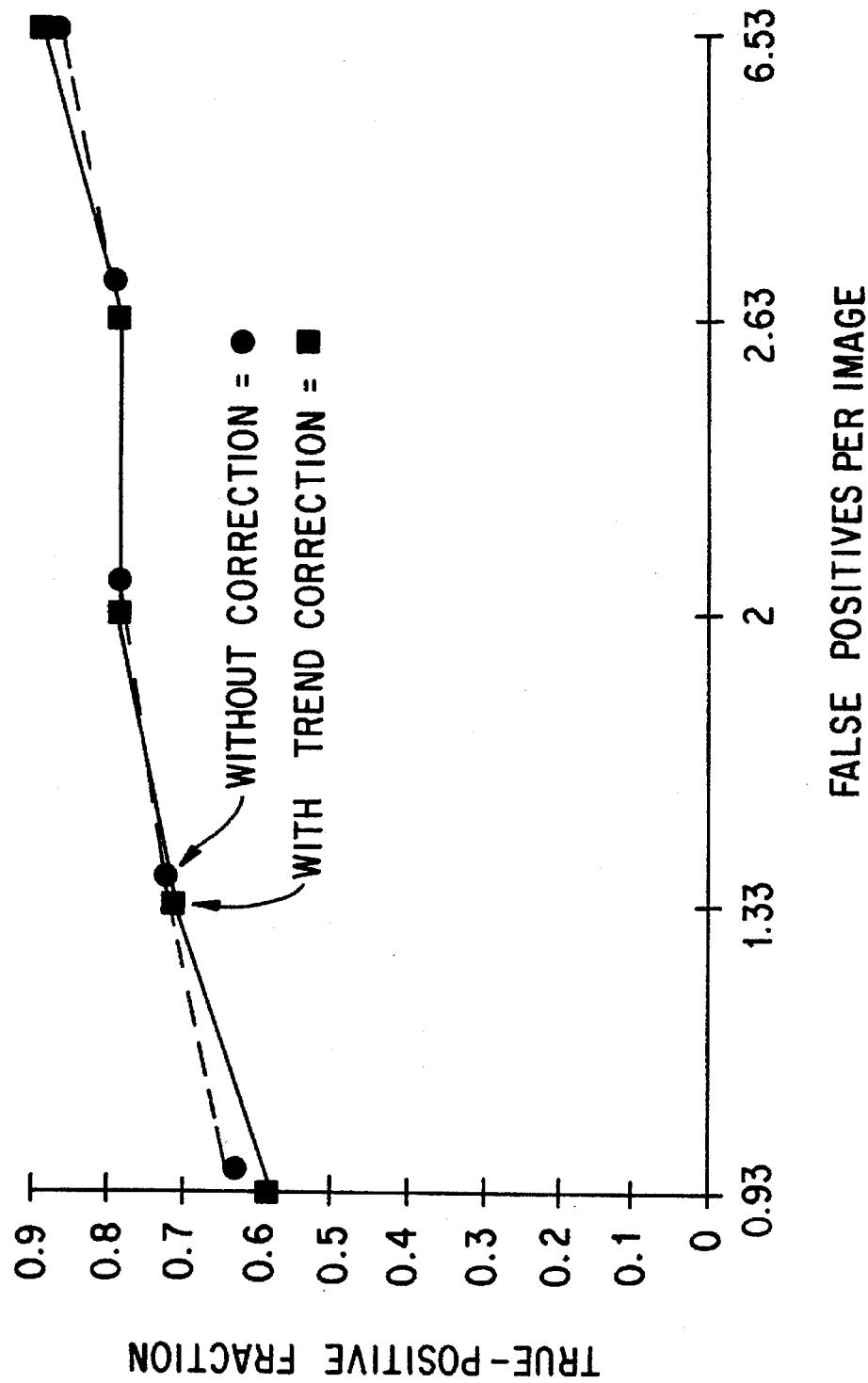
FIG. 13 is a graph illustrating the improvement in performance when the dense portions are background corrected prior to feature analysis in a computerized detection scheme.

FIG. 13 is a graph illustrating the improvement in performance when the dense portions are background corrected prior to feature analysis in a computerized detection scheme.

Figure 14:
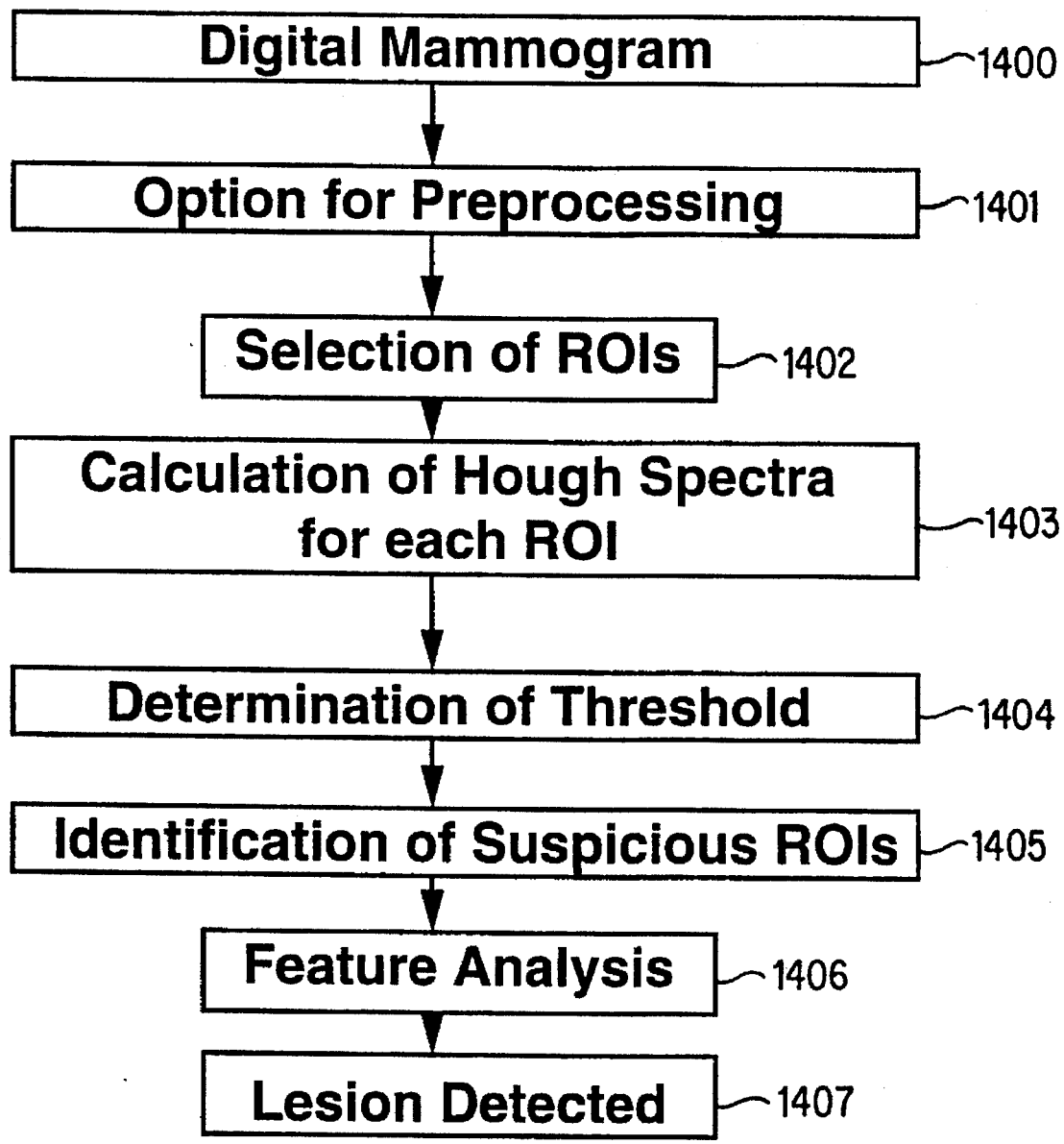
FIG. 14 is a schematic diagram illustrating the automated method for detection of lesions such as masses and tissue (parenchymal) distortions in breast images using the Hough spectrum.

FIG. 14 is a schematic diagram illustrating the automated method for detection of mass lesions and tissue (parenchymal) distortions in breast images using the Hough spectrum. Mammographic stellate lesions and architectural distortions are usually associated with malignancy, which makes them important signs in the screening of breast cancer. This method for the automatic detects these lesions with the use of a Hough spectrum-based geometric texture analysis. The Hough spectrum technique is developed from the traditional Hough transform, which is effective in the description of geometric structures. The Hough spectrum inherits such an ability and extends it into texture analysis for the description of those texture features geometric in nature, such as the spicula of a stellate lesion.

In step 1400 a digitized mammogram is obtained, either in its original form or after optional preprocessing (step 1401). Optional preprocessing can consist of, for example, dense portion processing, histogram equalization, peripheral enhancement or edge enhancement. ROIs (regions of interest) are then selected in the image (step 1402). Each of these ROIs is then transformed into its Hough spectrum (step 1403), and thresholding is conducted thereafter with a threshold level based on the statistical properties of the spectrum (step 1404). Those ROIs with strong signals of spiculation are then screened out as the primary suspicious regions (step 1405). These regions are further subject to feature analysis (step 1406), and the results are detected lesions (step 1407).

FIGS. 15A–15I are schematic diagrams illustrating the principle of the Hough transform and thus introducing the concept of Hough spectrum. The Hough transform is described in Russ, supra, at pages 495–500. Hough transform stems from the very general format of object description with Eq. (1):

$$f(\vec{x}, \vec{a}) = 0$$

where $\vec{x} = (x_1, x_2, \ldots, x_n)^T$ is a set of variables and $\vec{a} = (a_1, a_2, \ldots, a_m)^T$ is a set of parameters. Both may form a space of an appropriate dimension, which could be termed as spatial domain and parameter domain respectively.

Figure 15A:
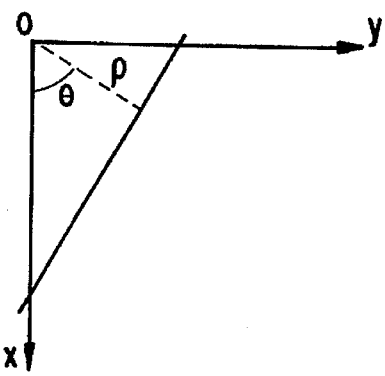
FIGS. 15A–15I are schematic diagrams illustrating the calculation of the Hough transform and the Hough spectrum.
Figure 15B:
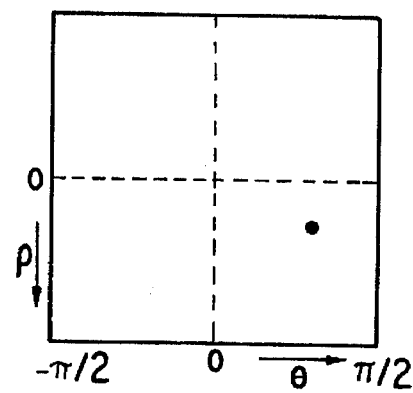

The description of many basic geometric elements, such as straight lines, circles, parabolas, etc. takes the form of equation (1). For example, under the so-called normal parameterization, a straight line can be described by the following equation:

$$\rho = x \cos \theta + y \sin \theta \qquad (2)$$

where $\rho$ is the distance from the origin of the coordinate system to the described straight line, and $\theta$ is the angle between the $\rho$ axis and the normal of this line. The Hough transform maps this line to a single point at $(\rho, \theta)$ of the P-Θ parameter domain (FIGS. 15A and 15B).

Figure 15C:
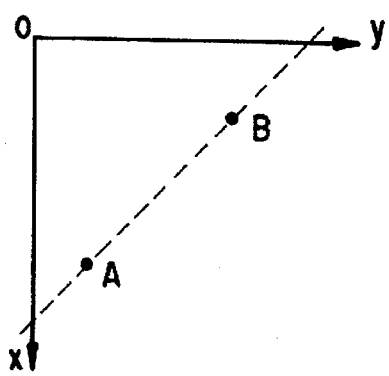
Figure 15D:
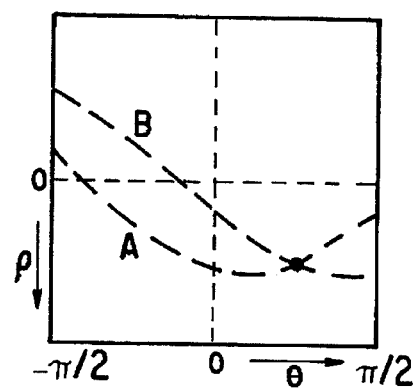

On the other hand, every point in the geometric space corresponds to a curve in the parameter domain according to Eq. (2), and the crosspoint of two such curves corresponds to a straight line in the spatial domain that is determined by the two corresponding points (FIGS. 15C and 15D).

Figure 15E:
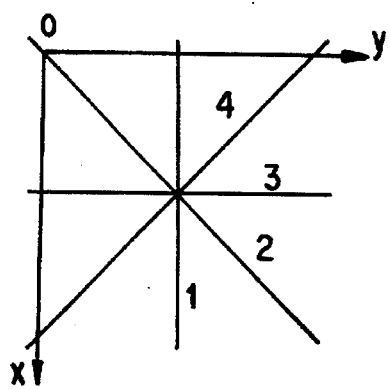
Figure 15F:
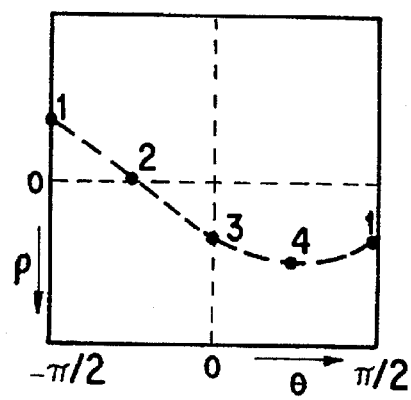

Therefore, the colinearity in the original image can be examined through Hough transform by observing the accumulation on the number of passing curves at each possible crosspoint position in the parameter domain. Also, the Hough transform of a family of corradial lines is a group of points lying on one and the same sinusoidal curve (FIGS. 15E and 15F). This dual property of the point-to-curve transformation forms the foundation of the Hough transform in detection of geometric elements.

Figure 15G:
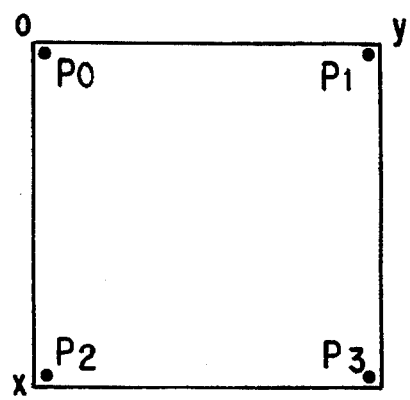
Figure 15H:
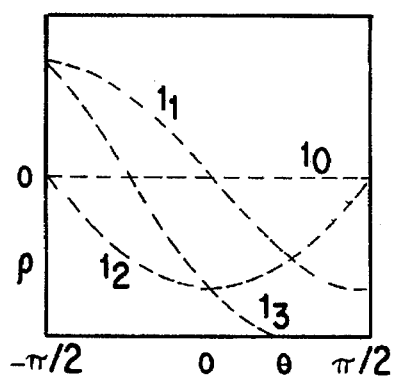
Figure 15I:
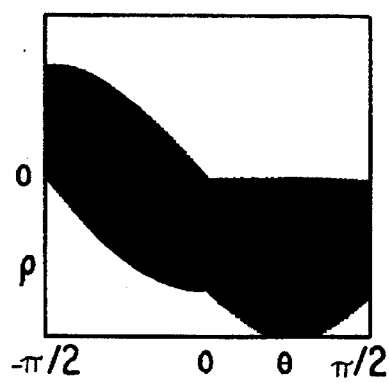

In FIG. 15G four points $P_0$–$P_3$ are located in the corners of the x-y space. FIG. 15H illustrates the corresponding Hough spectra as lines $l_0$–$l_3$ while FIG. 15I illustrates the area of the Hough spectrum.

The above-mentioned technique is useful in the detection of certain geometric figures rather than the textural patterns composed of elements which can be characterized geometrically. This is because textural features are the properties possessed by the entire structural content of the object, rather than certain parts of it, such as its edges. In order to describe a texture feature of geometric characteristics, a consideration on the internal contents of the objects is needed.

The Hough transform is a technique successfully developed in digital image processing, and transformed functions are digital data as well. Assume that f(x,y), where (x,y=0, 1, ..., N-1) is the original image, and h(u,v) where (u=0, 1, ..., $M_h$-1; v=0, 1, ..., $N_h$-1) denotes the outcome of the transformation. Now line up both and by rows (or columns) separately into column vectors and:

$$\xi = \begin{bmatrix} \xi_1 \\ \cdot \\ \cdot \\ \cdot \\ \xi_k \\ \cdot \\ \cdot \\ \xi_{N^2} \end{bmatrix}$$

$$\zeta = \begin{bmatrix} \zeta_1 \\ \cdot \\ \cdot \\ \zeta_l \\ \cdot \\ \cdot \\ \zeta_{M_h \times N_h} \end{bmatrix}$$

so that:

$$\xi_k = f(x,y) \quad (5)$$

and $$\zeta_l = h(u,v) \quad (6)$$

where:

$$k = xN + y + 1 \quad (7)$$

$$l = uN_h + v + 1 \quad (8)$$

Then, the Hough transform can be expressed in terms of matric algebra as follows (Eg. 9):

$$\zeta = A\xi$$

where $A = [a_{lk}]_{N^2 \times MN}$ is defined as a 0-1 matrix, where $a_{lk}=1$ under the transformation constraint such as Eq. (2), a pixel at (x,y) in f contributes to the accumulation at position (u,v) in h, and k, l are given here by Eqs. (7) and (8) respectively, and $a_{lk}=0$ otherwise.

The accumulation in Hough transform is fulfilled in Eq. (9) by matric multiplication. Here, $\vec{\zeta}$ is referred to as the Hough spectrum. $\vec{\xi}$ is the image to be transformed, different $\vec{\xi}$ may result in different $\vec{\zeta}$. However, as long as it is in the description of the same element, matrix A remains unchanged. A is the kernel of the Hough transformation.

Matrix A is determined by two major factors, the transformation medium and the quantization of the parameter space. The transformation medium is a concept composed of the element under the discussion of current transformation together with its parameterization, which decides the specific form of the constraints to be observed during the transformation. An example of the transformation medium is given by Eq. (2), where a straight line under the normal parameterization is specified. The quantization of the parameter space will also affect the formation of matrix A. This can be seen intuitively from its influence on the dimension of $\vec{\zeta}$.

What the matrix A depicts are all the possible transformations induced by each and every pixel of the original image. There are no specific preprocessing requirements on $\vec{\xi}$. For instance, it needs not to be a binary edge image of the original data, as were the cases where the traditional Hough transform were typically applied. However if one is calculating the Hough spectrum on a binary image, one obtains the Hough transform. Therefore, what the transformation kernel A represented is a more generalized transformation which includes the traditional Hough transform as one of its specific cases.

In the specification of a particular Hough transformation, careful consideration should also be given to the quantization of the parameter space. This is because it will not only define one dimension of matrix A, and therefore the amount of data involved in the transformation; but also in essence affect the effectiveness of the accumulation process.

Hough technique is developed on the basis of digital data. However, the discretization of both the spatial and parameter domain may exert an influence on Hough spectrum's quantization. The digitization errors in the images to be transformed is one of the major factors to be taken into account. Theoretically, a straight line in the spatial domain corresponds to a sole point in its parameter space through the Hough transform. In the case of digital images, there are measurement errors in spatial coordinates due to discontinuity. Therefore in order for the pixels of one and the same line segment in an original image to be accumulated into a single position on its Hough spectrum, the relation between the digitization errors of the coordinates of a digital image and the quantization of its Hough spectrum should be taken into consideration.

Figure 16A:
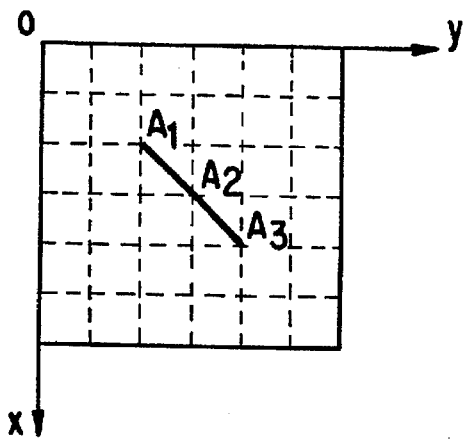
FIGS. 16A–16D are schematic diagrams illustrating the influence of digitization error of the spatial coordinates on the resolution of the Hough spectrum.
Figure 16B:
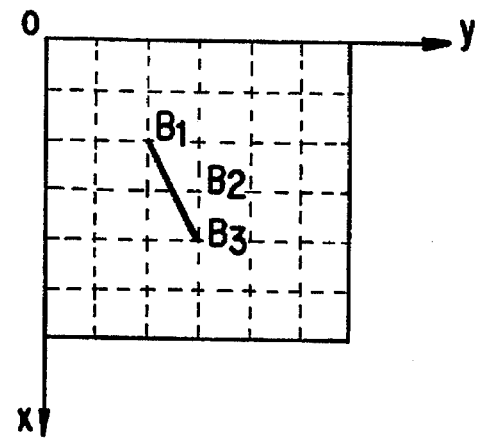
Figure 16C:
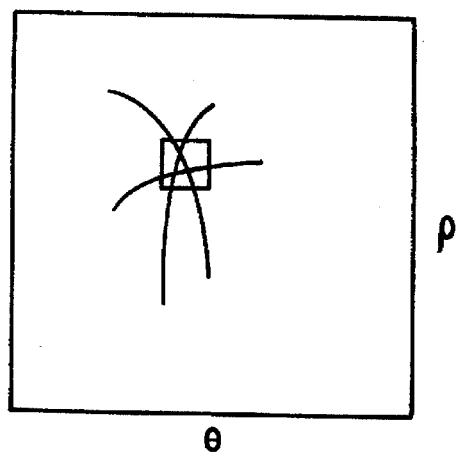

FIGS. 16A–16D are schematic diagrams illustrating the influence of digitization error of the spatial coordinates on the quantization of the Hough spectrum. The spatial image in FIG. 16A contains a line segment $\overline{A_1A_2A_3}$, none of the coordinates of the pixels on which have a digitization error. As a result, the curves transformed from pixel $A_1$, $A_2$, and $A_3$ intersect with one another at exactly the same point in its Hough spectrum, as shown in FIG. 16C.

Figure 16D:
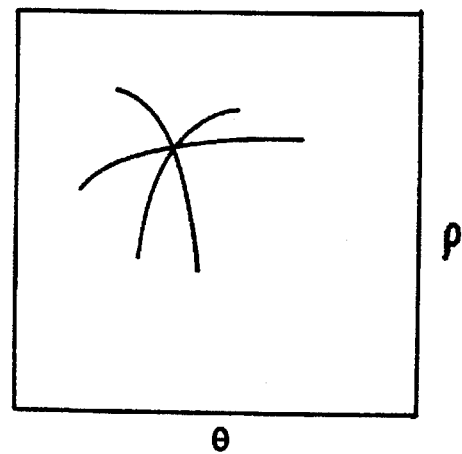

In the image of FIG. 16B, the x-coordinate of pixel $B_2$ has to be rounded to its nearest integer, resulting in three close but different intersection points in its Hough spectrum by every two of the curves corresponding to these three pixels of line segment $\overline{B_1B_2B_3}$. Therefore, if the pixel size of the Hough spectrum in FIG. 16D is large enough to cover the area of all three crosspoints, a correct accumulation of pixels $B_1$, $B_2$, and $B_3$ can still be achieved. This manifests the importance of the appropriate quantization of the Hough spectrum. The images have an appropriate size, such as 512×512, and image pixel size, such as 0.5 mm.

Since the actual area of the Hough spectrum is predefined, the enlargement of the pixel size implies the reduction of its resolution. In the case of dealing with normal-parameterized straight lines, the resolution of its Hough spectrum on the ρ-axis should be reduced by a factor of more than 1+√2, relative to that on the original image.

The actual Hough spectrum may only be on a restricted area of the parameter space. Under Eq. (2), the Hough spectrum is defined within the range:

$$-\pi/2 \leq \theta \leq \pi/2 \quad (11)$$

$$-(N-1) \leq \rho \leq \sqrt{2}(N-1) \quad (12)$$

The real domain of this Hough spectrum is shown by FIG. 16C. When θ varies from −π/2 to π/2, ρ is within those ranges restricted stepwise by four sinusoidal curves $l_0, l_1, l_2,$ and $l_3$, which correspond to the transformation of the four corner pixels of the matrix: $P_0(0,0)$, $P_1(0,N-1)$, $P_2(N-1,0)$, and $P_0(N-1,N-1)$ of FIGS. 16A and 16B.

The Hough spectrum is attained through the same type of transformation as the traditional Hough transform. The Hough transform is employed to extract specific geometric features from image objects by analyzing accumulation peaks in the corresponding parameter space. It is effective to deal with figures obtained from image objects. On the other hand, the information contained in a Hough spectrum may be extracted from two dimensional objects, for example, a stripe instead of a line segment. Yet it still possesses the ability of geometric feature description.

Figure 17A:
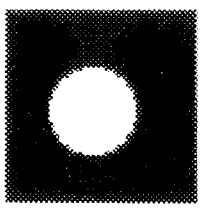
FIGS. 17A–17L illustrate the lesions of a simulated circumscribed lesion (17A), a simulated spiculated lesion (17B), and a simulated parenchymal distortion without the presence of normal parenchymal tissue (17C), the corresponding Hough spectra (17D–17F) and the Hough spectra after thresholding with η=2.4 (17G–17I) and after thresholding with η=2.6 (17J–17L)
Figure 17D:
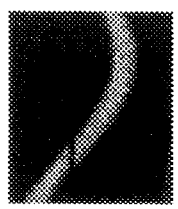
Figure 17G:
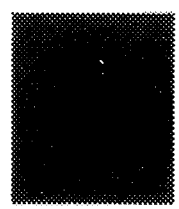
Figure 17J:
Figure 17B:
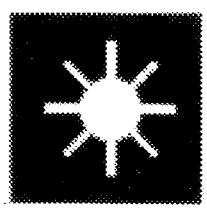
Figure 17E:
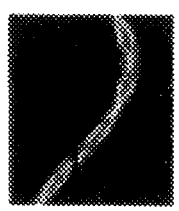
Figure 17H:
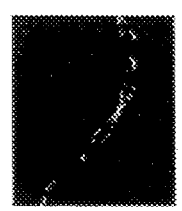
Figure 17K:
Figure 17C:
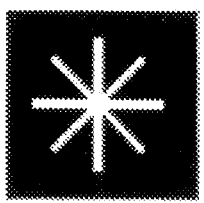
Figure 17F:
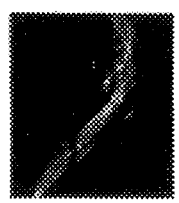
Figure 17I:
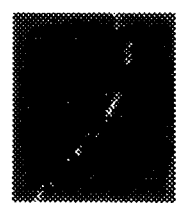
Figure 17L:
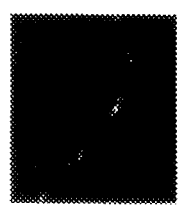

FIGS. 17A–17C illustrate a simulated circumscribed lesion (17A), a simulated spiculated lesion (17B), and a simulated parenchymal distortion without the presence of normal parenchymal tissue (17C). The corresponding Hough spectra are shown in FIGS. 17D–17F, the spectra after thresholding with η=2.4 and η=2.6 are shown in FIGS. 17G–17I and 17J–17L, respectively.

Figure 18D:
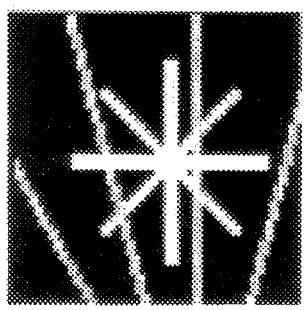
FIGS. 18A–18T contains figures illustrating the lesions of normal parenchymal background (18A), a simulated circumscribed lesion (18B), a simulated spiculated lesion (18C), a simulated parenchymal distortion with the presence of normal parenchymal tissue (18D), the corresponding Hough spectra (18E–18H) and the Hough spectra after thresholding with η=2.0 (18I–18L), after thresholding with η=2.1 (18M–18P), and after thresholding with η=2.2 (18Q–18T)
Figure 18H:
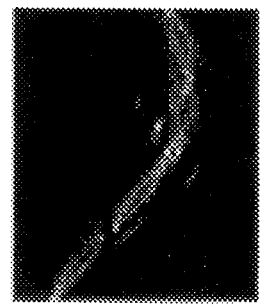
Figure 18C:
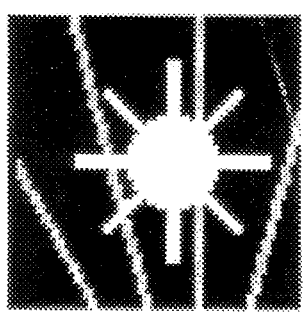
Figure 18G:
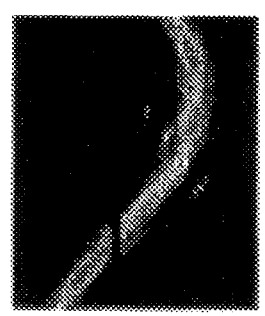
Figure 18B:
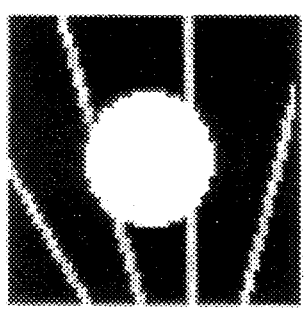
Figure 18F:
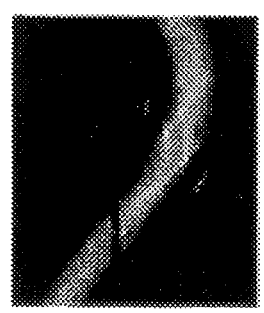
Figure 18A:
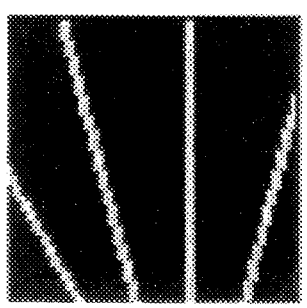
Figure 18E:
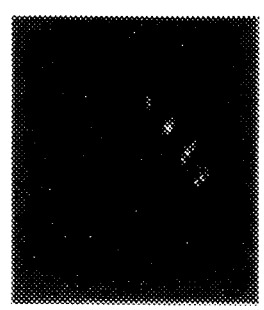

FIGS. 18A–18D illustrate a simulated normal parenchymal background (18A), as well as a simulated circumscribed lesion (18B), a simulated spiculated lesion (18C), and a simulated parenchymal distortion with the presence of normal parenchymal tissue (18D). The corresponding Hough spectra are also illustrated in FIGS. 18E–18H along with the spectra after thresholding at η=2.0 (FIGS. 18I–18L), at η=2.1 (FIGS. 18M–18P) and at η=2.2 (FIGS. 18Q–18T), respectively. The four image patterns have components of stripes and a disc. Each image is of size 64×64 pixels, and zoomed by a factor of 4 in both dimensions ease of viewing. In FIG. 18A, there are four stripes, each of which are of 2 pixels wide. These stripes are tilted by −15°, 0°, 15°, and 30° relative to horizontal. FIGS. 18B is the overlap of a disc on the background image of FIG. 18A. FIG. 18D is composed of the superposition of the background (FIG. A) and a star shaped object formed of four stripes, horizontal, vertical, diagonal, all of the width of three pixels and crossed one another at their centers. In FIG. 18C, another disc is overlapped on FIG. 18D by placing it on the center of the star shaped object.

Just as in the case of traditional Hough transform, the useful information in a Hough spectrum lies in the accumulated peaks. As a result, a Hough spectrum should be thresholded first before any further analysis. The threshold τ is determined based on statistical properties of Hough spectrum's magnitude function as follows:

$$\tau = \mu + \eta \sigma \quad (13)$$

where μ and σ are the mean and standard deviation of the Hough spectrum respectively, and η is a factor. Such a format is termed as mean-deviation combination.

Figure 19:
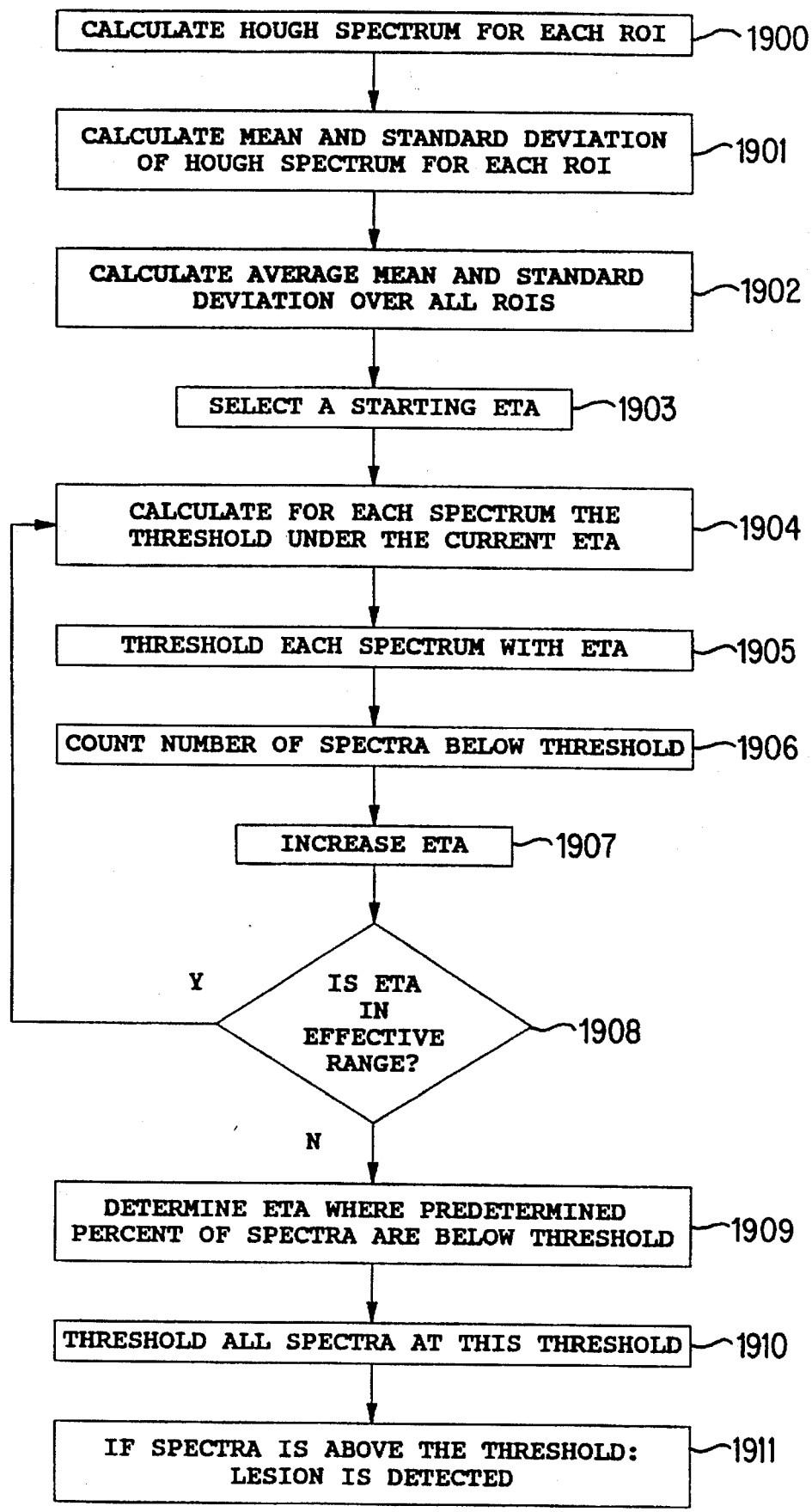
FIG. 19 is a schematic diagram illustrating the method for thresholding the Hough spectra.

Although useful information may be contained in a Hough spectrum, to extract it successfully, the critical point is to find an effective way to threshold the Hough spectrum. In the present invention, this becomes the development of a particular technique for the selection of η, as shown in FIG. 19. Even more effective is the automatic thresholding of the Hough spectrum. In the present invention, an automatic technique is used for the selection of η.

FIG. 19 is a schematic diagram illustrating the method for thresholding the Hough spectra. The mammographic image is divided up into a number of ROIs. For example, for a 512×512 pixel image, 64×64 pixels ROIs may be used. The Hough spectrum is calculated for each ROI (step 1900). The mean and standard deviation of the Hough spectrum for each ROI is also calculated (step 1901) as well as the average mean and standard deviation over all of the ROIs (step 1902). A starting η is chosen (step 1903) and the threshold τ for each spectrum is determined (step 1904). In step 1905, each spectrum is thresholded at the starting η. The number of spectra below the threshold τ is determined (step 1906).

Figure 22:
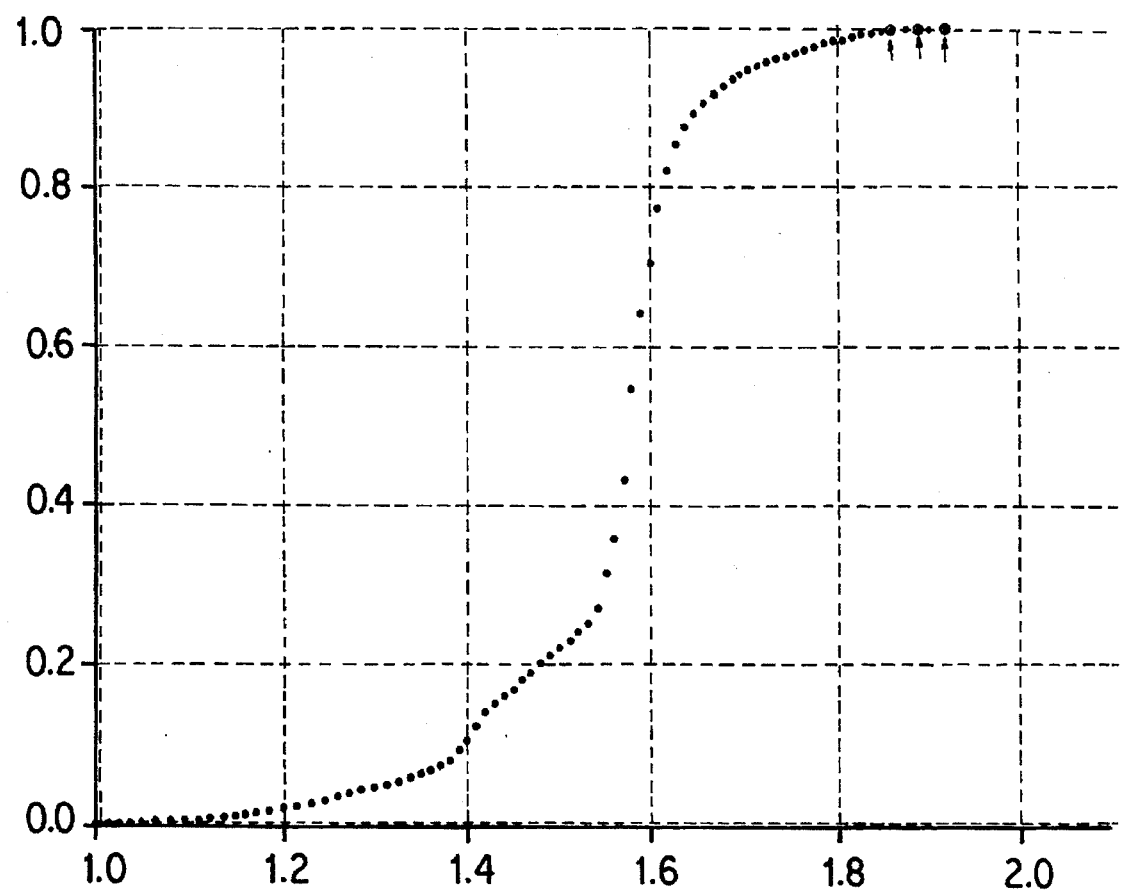
FIG. 22 is a graph illustrating the relationship between and the number of ROIs whose Hough spectrum has pixels above threshold level.
Figure 21A:
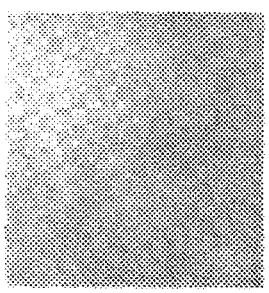
FIGS. 21A–21L are images of ROIs from a mammogram which contained normal parenchymal tissue (21A), a spiculated lesion (21B), and a smooth bordered lesion (21C), the corresponding Hough spectra (21D–21E) and thresholded Hough spectra at η=1.4 (21G–21I) and η=1.7 (21J–21L)
Figure 21B:
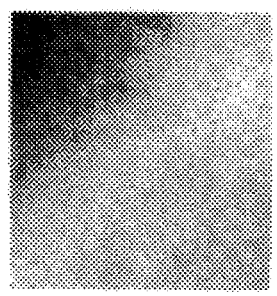
Figure 21C:
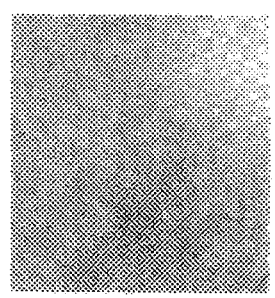
Figure 21D:
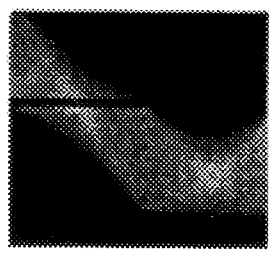
Figure 21E:
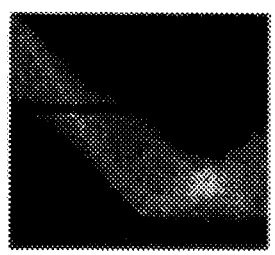
Figure 21F:
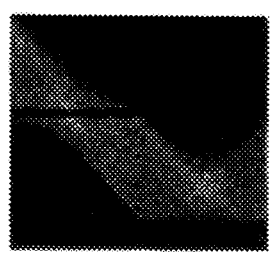
Figure 21G:
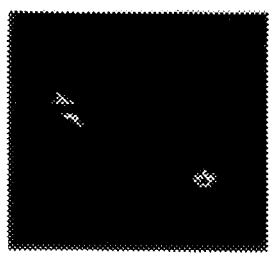
Figure 21H:
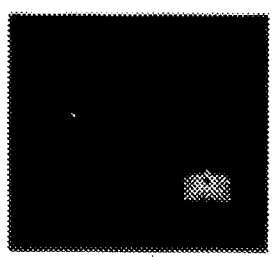
Figure 21I:
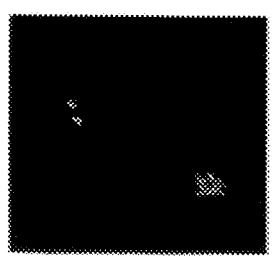
Figure 21J:
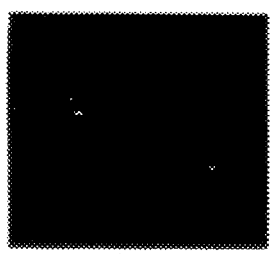
Figure 21K:
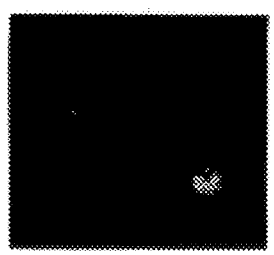
Figure 21L:
Figure 23A:
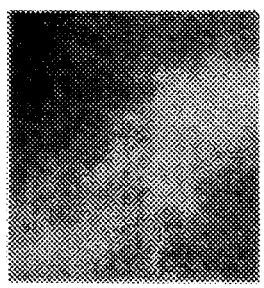
FIGS. 23A–23L are images of ROIs from a mammogram which contained an architectural distortion (23A), two regions of normal parenchymal tissue (23A–23B) along with the corresponding Hough spectra (23D–23F) and thresholded spectra at η=1.6 (23G–23I) and at η=1.7 (23J–23L)
Figure 23B:
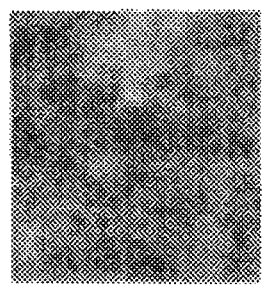
Figure 23C:
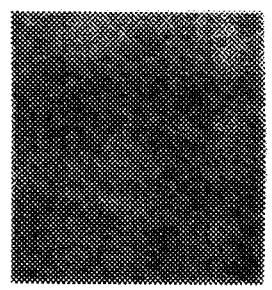
Figure 23D:
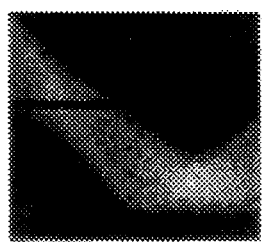
Figure 23E:
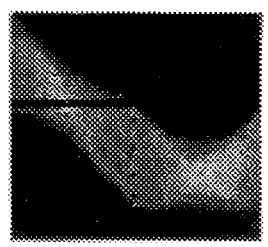
Figure 23F:
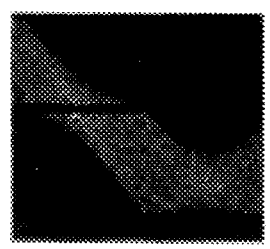
Figure 23G:
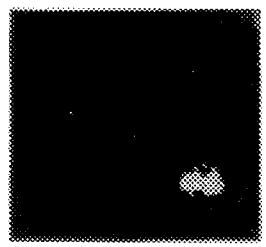
Figure 23H:
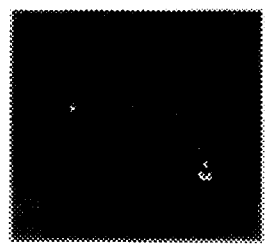
Figure 23I:
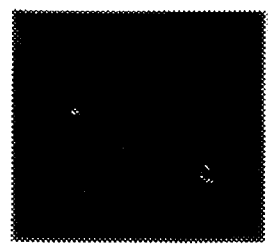
Figure 23J:
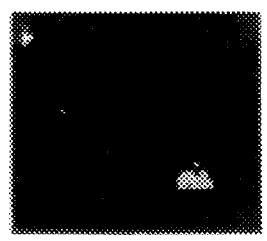
Figure 23K:
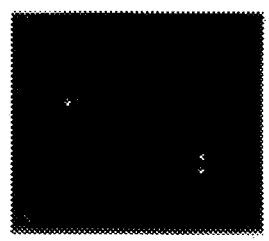
Figure 23L:
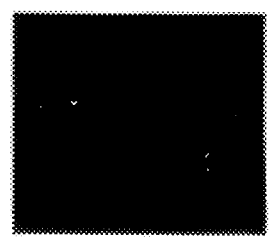

After increasing η in step 1907, a check is made to determine whether η remains within an effective range (step 1908). An effective range is usually 1–3 standard deviations (η=1–3). If η is in the effective range, η is increased and steps 1904–1908 are repeated at the new η. The increase in η is appropriately chosen based on constraints such as processing time and can be in the range 0.1–0.2. Once η is no longer in the effective range, the η at which a predetermined percentage of spectra are below a threshold $\tau_0$ is determined (step 1909), and is illustrated in FIG. 22, discussed below. All of the spectra are thresholded at the threshold $\tau_0$ corresponding to this η (step 1910). Any spectra above the pixel threshold are determined to be a detected lesion.

Figure 18L:
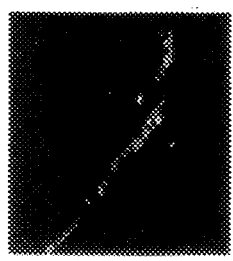
Figure 18P:
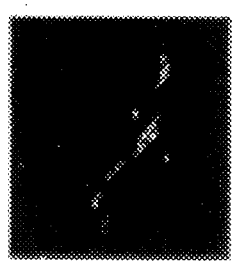
Figure 18T:
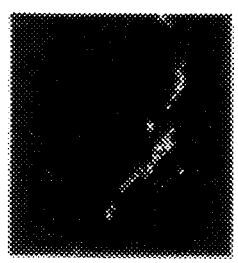
Figure 18K:
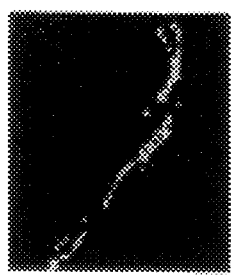
Figure 18O:
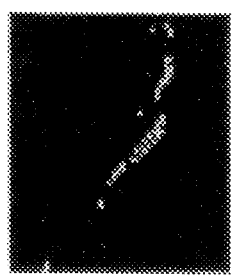
Figure 18S:
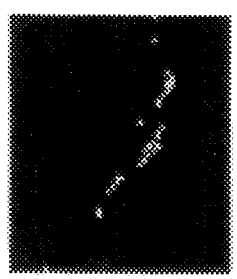
Figure 18J:
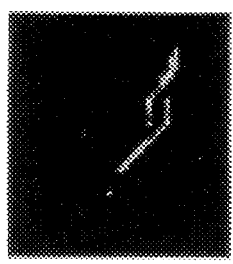
Figure 18N:
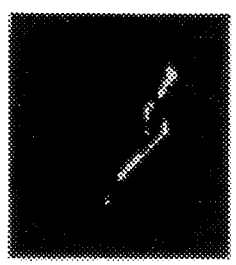
Figure 18R:
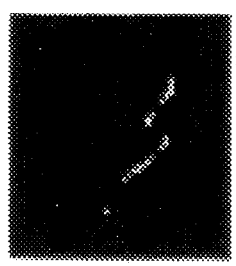
Figure 18I:
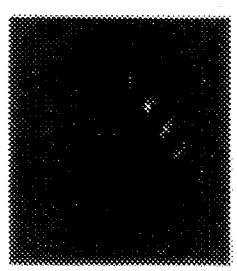
Figure 18M:
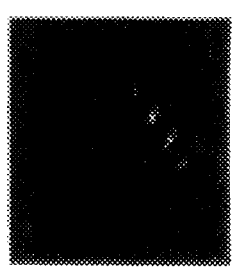
Figure 18Q:
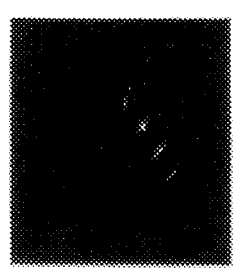

FIGS. 18E–18H show the thresholded Hough spectra of FIGS. 18A–18D, with η=2.6. All four stripes in FIG. 18A are represented by a corresponding group of peak pixels. However the "height" of these peaks are different, caused by the relative strength of the original signal, e.g. the length of stripes. In FIGS. 18K AND 18L, four groups of pixels can be found at the angle near −90°(90°), −45°, 0°, and 45°, reflecting the presence of the star shaped object in FIGS. 18C and 18D, respectively, and they are roughly co-sinusoidal as those stripes which form the star are corradial. The background signal is not as strong as that in FIG. 18I, and the peak for the shortest stripe is even thresholded out. Also, some peak pixels around θ=0° are caused by the "crosstalk" among different objects in the original image, a problem inherited from the traditional Hough transform. This is more obvious in FIG. 18J when the desired signal is weakened further for this reason.

The Hough spectrum can be applied to two dimensional objects. This is very important because these objects could be the basic units to form a texture pattern. Therefore, the information attained from Hough spectrum can actually serve the purpose of analyzing textural patterns geometric in nature.

The radiographic appearance of the breast tissue is abundant in the textural information composed of bright and slender unite structures. Generally, the distribution of these textural elements takes the pattern of radiating from nipple to the chest wall, which makes them roughly parallel to one another locally. The presence of certain abnormal structures such as a spiculated mass or an architectural distortion, however, may alter this trend by generating another radiating center, thus changes the textural appearance dramatically in a neighboring area.

Figure 20:
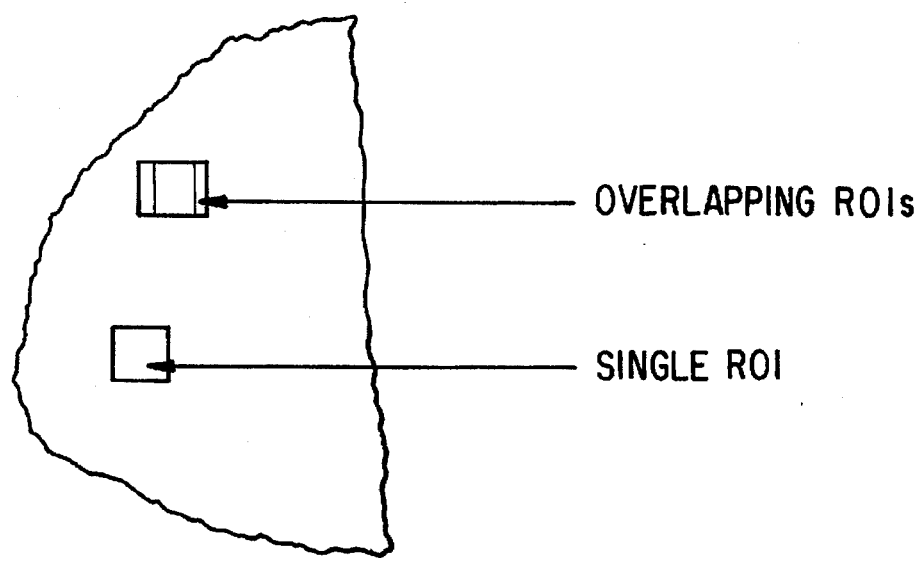
FIG. 20 is a schematic diagram illustrating the placement of ROIs within the breast region of a mammogram.

The basic structural unit of the mammographic textural pattern can be modeled as stripe. Hence, the Hough spectrum based technique can be applied to analyze the mammographic textural pattern, especially for the detection of the above mentioned abnormal structures. FIG. 20 is a schematic diagram illustrating the placement of ROIs within the breast region of a mammogram. From the image data within each ROI a Hough spectrum is calculated.

FIGS. 21A–21L are images of ROIs from a mammogram which contain (21A) normal parenchymal tissue, (21B) a spiculated lesion, and (21C) a smooth bordered lesion, along with the corresponding Hough spectra (21D–21F) and thresholded spectra at $\eta=1.4$ (21G–21I) and at $\eta=1.7$ (21J–21L). Due to the additional spicula of the mass lesion, the accumulation is concentrated on more pixels in the generation of FIG. 21E than that of the other two. Therefore more pixels survive the thresholding as can be seen from FIGS. 21H–21K. This is used as a basis to differentiate the ROIs of abnormal structures from normal ones. By thresholding using $\eta$ those ROIs are segmented having a Hough spectrum with a heavily concentrated accumulation.

Accumulation can be done either by counting the number of pixels above threshold within the Hough spectrum for an ROI, by taking a weighted sum of the pixels within an ROI where the weights correspond to the gray value for each pixel or by incorporating the "spatial distribution" of the pixels above threshold in the spectrum. In the latter instance the surviving pixels do not correspond to the particular characteristics of the suspect lesion.

An accumulation threshold (predetermined number of pixels surviving within a Hough spectrum) is used to eliminate those ROIs having an accumulation below the threshold. This threshold is empirically derived from a database of mammograms. Also important here is that the thresholding of the accumulations can be performed automatically.

FIG. 22 is a graph illustrating the relationship between $\eta$ and the number of ROIs whose Hough spectrum has pixels above threshold level. Typically, a percentage of 75–99% of the spectra being below the threshold is used to determine $\eta$ to be used as an appropriate cutoff value. Arrows 2200 indicate the $\eta$ level at which lesions (masses and/or parenchymal distortions) are detected. In the method shown in FIG. 19 the loop calculates the curve shown in FIG. 22 and the thresholding is performed by selecting a value of $\eta$ from the curve that allows a certain number of suspicious regions to be identified. A plot of the threshold versus accumulation would appear similar to the curve of FIG. 22.

FIGS. 23A–23L are images of ROIs from a mammogram which contained (23A) an architectural distortion, (23B and 23C) two regions of normal parenchymal tissue along with the corresponding Hough spectra (23D–23F) and thresholded spectra at $\eta=1.6$ (23G–23I) and at $\eta=1.7$ (23J–23L). It is apparent that the larger accumulation occurs with the ROI overlapping the region of architectural distortion and can be identified as a distortion by thresholding the pixels as described above.

Two experiments were conducted with the application of Hough spectrum technique, one on the detection of spiculated masses and the other on that of architectural distortions. There were 29 mammograms from 16 cases, each containing a spiculated mass, and another 12 mammograms from 6 cases, each with one architectural distortion. Images in both sets of data were of the size 512×512 pixels, and were divided into 64×64 pixel ROIs placed overlappingly with either a horizontal or a vertical shift of 8 pixels. Each ROI was transformed into its Hough spectrum first, and thresholding was conducted on it with the threshold determined according to Eq. (13) and as described with respect to FIGS. 19 and 22. The thresholded ROIs were then classified into two categories to screen out those with strong signals of spiculation as regions of potential lesions.

In the experiments, 17 spiculated masses and 7 sites of architectural distortion were identified among all the images. This performance results in detection rates of 81.25% for spiculated masses and 66.67% for architectural distortions at the corresponding false positive rates of 0.97 and 2.17 per image, respectively.

Figure 24:
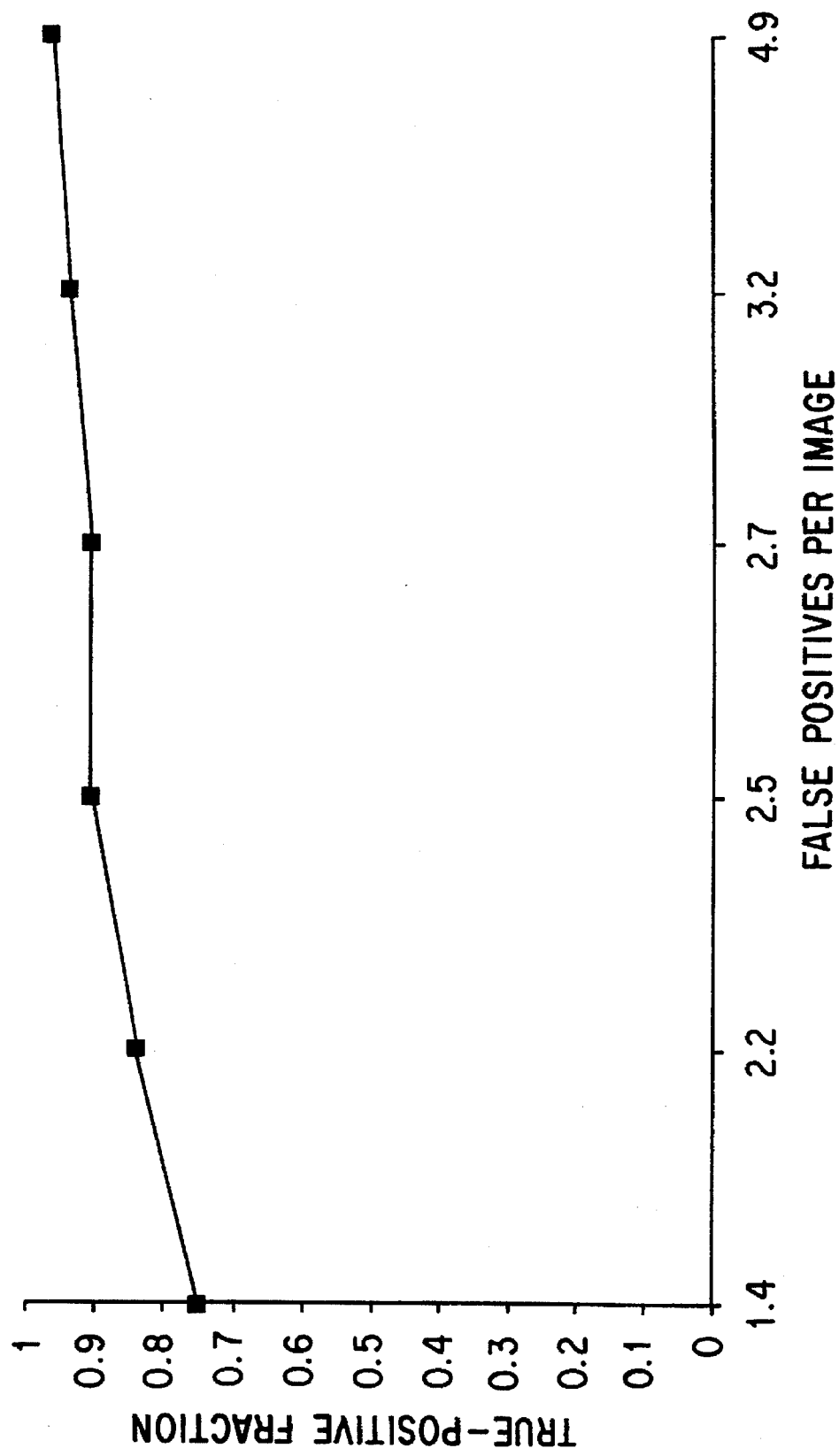
FIGS. 24 are graphs illustrating the detection performance of the detection scheme as the threshold level when η is varied.

Another experiment was also conducted on the examination of the detection performance of this detection scheme as the threshold level was varied with $\eta$. The results are illustrated in FIG. 24 that shows an FROC (Free response Receiver Operating Characteristic) curve. FIG. 24 shows a high sensitivity and low false positive rate is possible with the method according to the invention.

Figure 25:
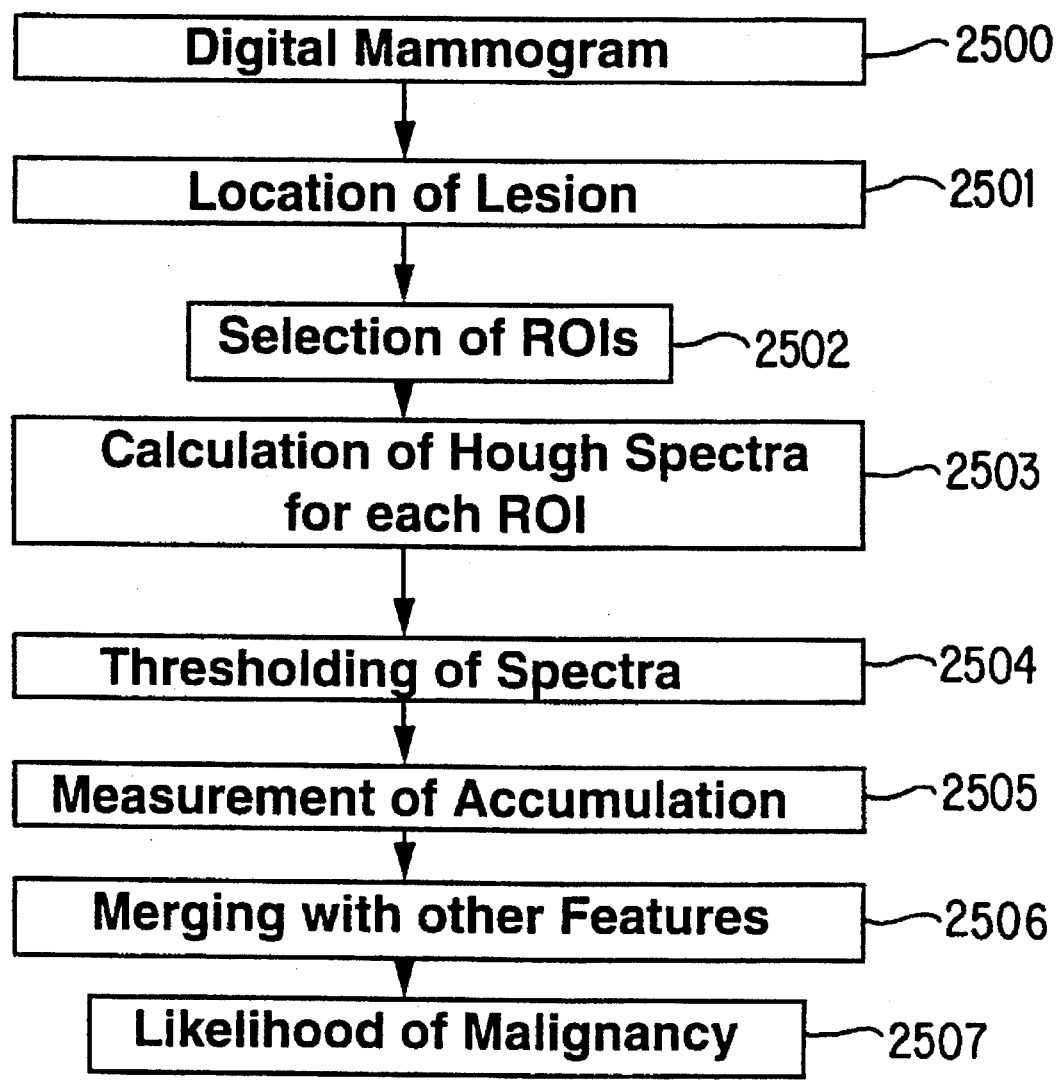
FIG. 25 is a schematic diagram illustrating the method for use of Hough spectra in distinguishing between malignant and benign lesions.
Figure 26A:
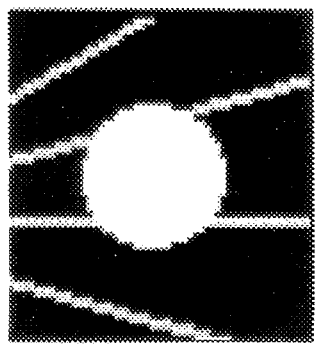
FIGS. 26A–26H contains images of a malignant lesion (26A) and a benign lesion (26B), the corresponding Hough spectra (26C–26D) and thresholded Hough spectra at η=2.0 (26E–26F) and η=2.2 (26G–26H), respectively.
Figure 26B:
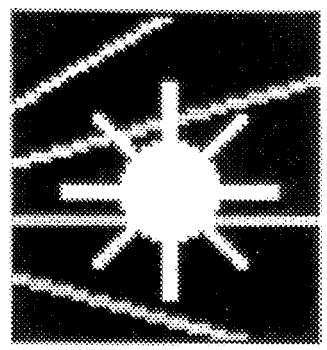
Figure 26C:
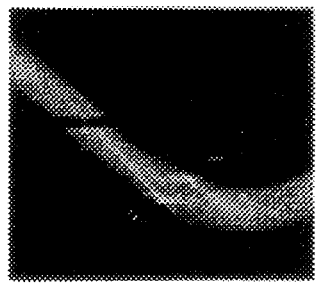
Figure 26D:
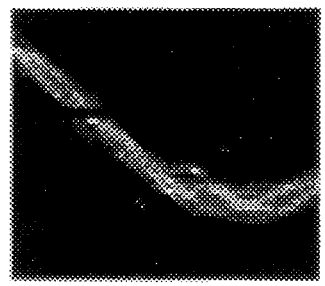
Figure 26E:
Figure 26F:
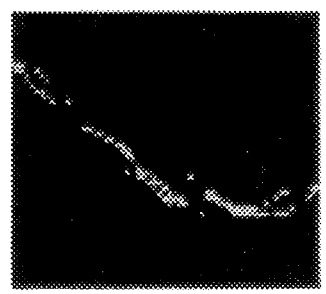
Figure 26G:
Figure 26H:
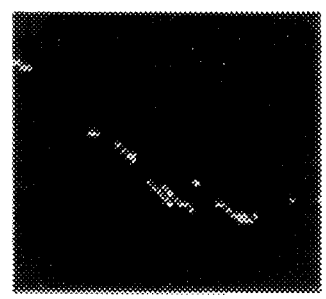

FIG. 25 is a schematic diagram illustrating the method for use of Hough spectra in distinguishing between malignant and benign lesions. In this method the larger accumulation in the Hough spectrum would indicate the presence of a spiculated rather than circumscribed lesion. Spiculation is one of the important features in determining the likelihood of malignancy. In this case, the accumulations can be thresholded once again to differentiate between spiculated and circumscribed lesions (whose accumulations survived the first thresholding and thus were determined to be suspect lesions). This second pixel threshold is again empirically derived.

After obtaining a digital mammogram (step 2500) the locations of lesions are determined (step 2501). Lesions can be located by a variety of methods, such as the Hough spectrum method, bilateral subtraction, and human identification. ROIs are then selected and placed around suspected lesion (one encompassing ROI or ROIS spread around the suspected lesion) on the mammogram in step 2502. The Hough spectra is calculated for each ROI (step 2503) and the spectra are thresholded using $\eta$ (step 2504), as described above. The accumulation is measured in step 2505. Accumulation is the counting of pixels that are above $\eta$. The results of the accumulation is merged with other features determined from the ROI (step 2506) using a neural network or rule-based scheme as describe above. Lastly, the method produces a likelihood of malignancy based on the accumulation and merged features (step 2507), as described in Ser. No. 08/158,389.

The pixel size in the spatial domain was chosen as 0.5 mm. After the Hough spectrum operation the matrix size in the Hough domain is 60 for $\theta$ and 54 for $\rho$. As the pixel size becomes smaller (matrix size becomes larger), the pixel size in the Hough domain can be smaller. If the pixel size in the spatial domain is too large and sampling errors occur, then in the Hough domain a larger pixel size is needed to get the correct accumulation. In this example, for a 0.5 mm pixel size, if a smaller pixel is used in the Hough domain an inaccurate accumulation may result.

FIGS. 26A–26H contain images of (26A) a malignant lesion and (26B) a benign lesion along with their corresponding Hough spectra (26C and 26D). Thresholded spectra at η=2.0 (26E–26F) and at η=2.2 (26G–26H) are also shown. The accumulation is higher for malignant lesions than for benign lesions.

Figure 27:
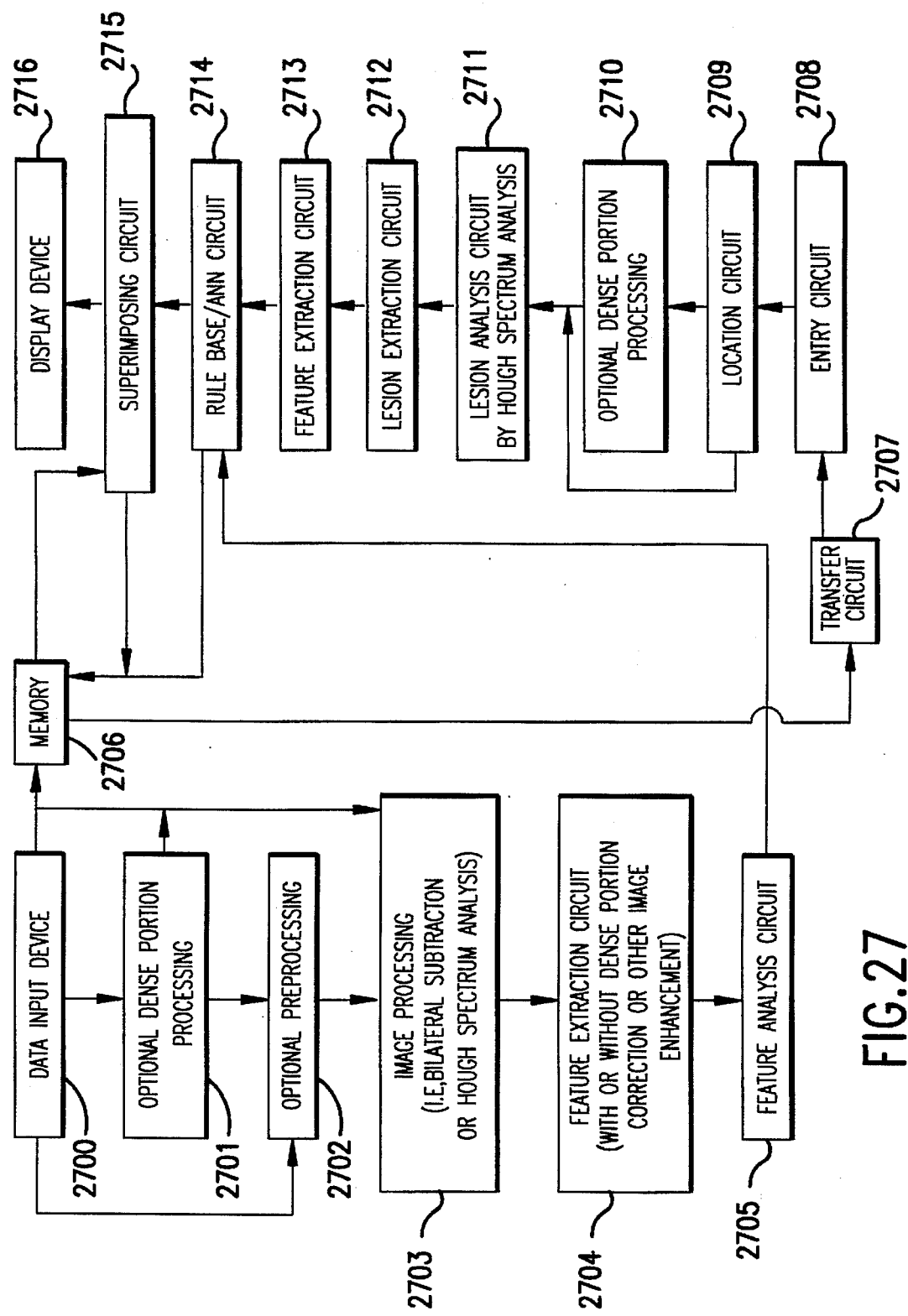
FIG. 27 is a schematic block diagram illustrating a system for implementing the automated method for the detection and/or characterization of lesions such as masses and tissue (parenchymal) distortions in breast images with the options for preprocessing.

FIG. 27 is a schematic block diagram illustrating a system for implementing the automated method for the detection and/or characterization of lesions such as masses and tissue (parenchymal) distortions in breast images with the options for preprocessing. A data input device 2700 is used to obtain the mammographic image. Typically device 2700 is an x-ray device to provide a radiographic mammogram and includes a digitizer such as laser scanner to produce a digital mammogram. The mammogram could be right and left images (as shown in FIG. 12A) or can be a single image (as shown in FIG. 12C). The original image (or images) is (are) stored in memory 2706 for later use. The mammographic image is optionally sent to a dense portion correction circuit 2701. Circuit 2701 performs the functions described in connection with FIGS. 1, 2 and 8 described above, (border segmentation, identification of subcutaneous fat, morphological filtering, ROI placement, histogram analysis, thresholding, curve fitting, normalization, background subtraction, calculation of percent dense, etc.) and produces a dense portion processed image. Circuit 2701 also can output the percent dense and delineate the subcutaneous fat. If desired the dense-portion corrected image may be outputted and viewed (not shown).

An optional preprocessing circuit 2702 receives the digital image or the dense portion corrected image. Circuit 2702 performs preprocessing of the received image such as dense portion processing, histogram equalization, peripheral enhancement or edge enhancement, as described above in connection with FIG. 14.

An image processing circuit 2703 receives an image (or images) from any of circuits 2700–2702 to perform image processing such as bilateral subtraction, subtraction or Hough spectrum analysis (as described above in connection with FIGS. 12A, 12C and 14). Circuit 2703 outputs a region or regions suspected of containing a lesion in the image received from any of circuits 2700–2702.

The output of circuit 2703 is fed to feature extraction circuit 2704. As described above with respect to FIGS. 12A, 12C and 14 the feature extraction circuit 2704 extracts features from the suspect regions in the image. The optional dense portion processing can be performed at this point.

The extracted features are input into a feature analysis circuit 2705 which performs feature analysis (as described above). After feature analysis detection is performed using an artificial neural network (ANN) trained to detect lesions or a rule-based scheme 2714, for example. The output of circuit 2714 can also be stored in memory 2706.

The output (detected lesions) of circuit 2714 is fed to a superimposing circuit 2715 where the computer has indicated on the original image the detected lesions. The image with the indicated lesions is shown on display 2716 (such as a video display terminal). Circuit 2715, along with display 2716, allow the user to indicate (using, for example, a light pen) on the original image other regions that are lesions or suspected lesions.

A transfer circuit 2707 transfers the mammogram (or mammograms) from memory 2706 to an entry circuit 2708 to prepare the image for processing and display by circuits 2709–2716 (the mammogram could also be directly fed from input device 2700 (not shown)). Location circuit 2709 extracts the lesion location information from the mammogram, as described with regard to FIG. 25. Dense portion processing can also be performed at this point by dense portion correction circuit 2710.

Circuit 2711 receives either the mammogram or the dense portion processed image, along with the extracted location information and calculates Hough spectra for regions of interest selected in the received image. The spectra are thresholded and the accumulation is measured, as described above with regard to FIG. 25. Based on the thresholding and accumulation lesions are extracted by lesion circuit 2712 and features are extracted by circuit 2713 in the same manner as circuit 2704.

The extracted lesion and features are input to circuit 2714 which detects lesions and indicates a likelihood of malignancy based upon the Hough spectrum analysis and accumulation. The detected lesions are superimposed on the original image by superimposing circuit 2715 and displayed on device 2716. A user can also indicate lesions on the original image.

Circuits 2701–2705 and 2709–2713 can implemented in software or in hardware as, for example, a programmed microprocessor. Circuit 2714 can also be implemented in software or can be implemented as a semiconductor neural network.

Obviously, numerous modifications and variations of the present invention are possible in light of the above technique. It is therefore to be understood that within the scope of the appended claims, the invention may be practiced otherwise than as specifically described herein. Although the current application is focused on the detection and classification of lesions in mammograms, the concept can be expanded to the detection of abnormalities in other organs in the human body, such as ill-defined lesions in images of the lungs and liver.

What is claimed as new and desired to be secured by Letters Patent of the United States is:

1. A method for enhancing visualization of a mammographic image, comprising:
   identifying in said image an anatomically dense portion of said image; and
   processing said dense portion to produce a processed image having a more uniform density.

2. A method as recited in claim 1, wherein identifying said dense portion comprises:
   identifying subcutaneous fat in said image, said image having a plurality of pixels; and
   excluding first pixels in said image corresponding to said subcutaneous fat to produce a fat-excluded image.

3. A method as recited in claim 2, comprising performing morphological filtering on said fat-excluded image.

4. A method as recited in claim 2, wherein excluding said first pixels comprises:
   identifying a breast border in said image;
   identifying a nipple position in said image;
   selecting a first row of pixels including said nipple position and having a first starting pixel;
   determining a gray-level threshold value in said image;
   excluding second pixels in said first row having a gray-level value less than said threshold and being within a selected distance of said first starting pixel;
   selecting a second row of pixels having a second starting pixel on said breast border; and
   excluding third pixels in said second row having a gray-level value less than said threshold and being within said selected distance of said second starting pixel.

5. A method as recited in claim 4, wherein determining said threshold comprises:
   placing a region on interest on said image proximate to a chest wall in said image;

generating a first gray-level histogram of fourth pixels in said region of interest;

generating a second gray-level histogram of said pixels in said image; and determining said gray-level threshold based on said first and second gray-level histograms.

6. A method as recited in claim 1, wherein identifying said dense portion of said image comprises:

placing a region on interest on said image proximate to at least one of a chest wall and a breast border in said image, said image having a plurality of pixels;

generating a first gray-level histogram of first pixels in said region of interest;

generating a second gray-level histogram of said pixels in said image; and determining a gray-level threshold based on said first and second gray-level histograms.

7. A method as recited in claim 6, comprising:

thresholding said image using said gray-level threshold to produce a thresholded image; and performing morphological filtering on said thresholded image.

8. A method as recited in claim 6, comprising:

thresholding said image using said gray-level threshold to produce a thresholded image; and performing at least one of feature analysis and multi-gray-level thresholding on said thresholded image.

9. A method as recited in claim 6, comprising:

thresholding said image using said gray-level threshold; and calculating a percent dense of said image.

10. A method as recited in claim 9, wherein calculating said percent dense comprises:

determining a first number of pixels in said image above said gray-level threshold;

determining a second number of pixels within a breast region of said image excluding pixels corresponding to subcutaneous fat; and dividing said first number by said second number.

11. A method as recited in claim 1, comprising:

background-trend correcting said dense portion.

12. A method as recited in claim 11, wherein background-trend correcting comprises:

curve fitting said dense portion to produce a fit to said dense portion;

subtracting said fit from said dense portion to produce a subtracted image; and normalizing said subtracted image.

13. A method according to claim 1, comprising:

processing said first image to produce a second image;

extracting features from said second image; and detecting a lesion in said image based on the extracted features extracted in said extracting step.

14. A method as recited in claim 13, wherein processing said dense portion is performed during extracting said features.

15. A method of detecting a lesion in a mammographic image, comprising:

determining a fat value of said image;

subtracting said fat value from said image to produce a subtracted image;

extracting features from said subtracted image; and inputting said features to a detection scheme.

16. A method of detecting a lesion in a mammographic image, comprising:

obtaining right and left mammograms;

identifying in at least one of said right and left mammograms an anatomically dense portion;

processing said dense portion identified in said identifying step so that the mammogram in which the dense portion is identified has a more uniform density;

processing said right and left mammograms after said step of processing said dense portion to obtain a combined image;

performing feature analysis on said combined image to extract features from said combined image; and detecting a lesion based on the extracted features.

17. A method as recited in claim 16, wherein said step of processing said dense portion comprises:

background-trend correcting said dense portion.

18. A method of analyzing a mammographic image, comprising:

selecting a plurality of regions of interest in said image;

calculating a Hough spectrum for each of said regions of interest;

determining a threshold using said Hough spectra;

thresholding said Hough spectra using said threshold;

identifying a region suspected of being a lesion in said image; and analyzing said region.

19. A method as recited in claim 18, wherein determining said threshold comprises:

determining a mean and a first standard deviation of each of said Hough spectra;

determining an average mean and a second standard deviation over all of said regions of interest;

selecting a starting threshold;

determining if each of said Hough spectra are below said starting threshold;

varying said starting threshold to a next threshold and determining if each of said Hough spectra are below said next threshold; and determining said threshold where a predetermined percentage of said Hough spectra are below said threshold.

20. A method as recited in claim 19, wherein selecting said starting threshold comprises:

selecting a starting value of $\eta$;

determining said starting threshold as $$\tau = \mu + \eta \sigma$$

where $\mu$ is said average mean and $\sigma$ is said second standard deviation.

21. A method as recited in claim 20, comprising:

incrementing $\eta$ to vary said starting threshold;

determining if $\eta$ is in an effective range; and determining said threshold where said predetermined percentage of said Hough spectra are below said threshold when $\eta$ is no longer in said effective range.

22. A method as recited in claim 19, comprising:

detecting said lesion in an ROI having at least part of one of Hough spectra above said threshold.

23. A method as recited in claim 22, comprising:

determining a second threshold at which a second predetermined number of said Hough spectra are below said second threshold; and detecting a parenchymal distortion in an ROI having at least part of one of said Hough spectra above said second threshold.

24. A method as recited in claim 22, comprising:
determining whether said lesion is malignant based on said accumulations; and
determining whether said lesion is benign based on said accumulations.

25. A method as recited in claim 19, comprising:
determining an accumulation for each of said Hough spectra thresholded at said threshold;
detecting said lesion based on said accumulation.

26. A method as recited in claim 25, comprising:
detecting a parenchymal distortion based on said accumulation.

27. A method as recited in claim 18, wherein said analyzing comprises:
measuring an accumulation for said region;
extracting at least one feature of said region using a feature analysis technique;
inputting said accumulation and said at least one feature into a lesion detection scheme; and
determining a likelihood of malignancy of said region using said lesion detection scheme.

28. A method as recited in claim 27, wherein inputting said accumulation comprises inputting said accumulation into an artificial neural network trained to determine malignancy of a suspect region in a mammogram.

29. A method as recited in claim 18, comprising:
performing preprocessing on said image prior to selecting said plurality of regions of interest.

30. A method as recited in claim 29, wherein said performing preprocessing comprises performing at least one dense portion processing, histogram equalization, peripheral enhancing and edge enhancing.

31. A method of analyzing an image, comprising:
locating a region suspected of containing a lesion;
selecting a plurality of regions of interest including said region;
calculating a Hough spectrum for each of said regions of interest;
determining a threshold using said Hough spectra;
thresholding said Hough spectra using said threshold to produce a thresholded Hough spectra;
determining an accumulation for each of said thresholded Hough spectra;
extracting at least one feature of said region using a feature analysis technique; and
analyzing said region using said accumulation and said at least one feature.

32. A method as recited in claim 31, wherein analyzing said region comprises:
inputting said accumulation and said at least one feature to a detection scheme; and
determining a likelihood of malignancy using said detection scheme.

33. A method as recited in claim 31, comprising:
obtaining a mammographic image;
detecting at least one of a mass and a parenchymal distortion in said mammographic image.

34. A method as recited in claim 31, comprising:
selecting a single region of interest containing said region;
calculating a single Hough spectrum for said single region of interest;
determining a threshold using said single Hough spectrum;
thresholding said single Hough spectrum using said threshold to produce a single thresholded Hough spectrum; and
determining an accumulation for said single thresholded Hough spectrum.

35. A method as recited in claim 34, wherein analyzing said region comprises:
inputting said accumulation and said at least one feature to a detection scheme; and
determining a likelihood of malignancy using said detection scheme.

36. A method as recited in claim 31, comprising:
detecting whether said region contains a malignant mass; and
detecting whether said region contains a benign mass.

37. A method as recited in claim 36, comprising differentiating between said malignant mass and said benign mass.

38. A system for visualization in an image, comprising:
an image acquisition device configured to acquire said image; and
a dense portion processing circuit connected to said image acquisition device and configured to identify an anatomically dense portion of said image and process said dense portion to produce a processed image having more uniform density.

39. A system as recited in claim 38, wherein said image acquisition device is a mammogram acquisition device.

40. The system of claim 38, comprising:
an image processing circuit connected to said dense portion processing circuit and configured to process said processed image having more uniform density;
a feature extraction circuit connected to said image processing circuit; and
a lesion detection circuit connected to said feature analysis circuit.

41. A system as recited in claim 40, comprising:
a lesion location superimposing circuit connected to said lesion detection circuit; and
an image display connected to said lesion location superimposing circuit.

42. A system for detecting lesions in an image;
an image acquisition device;
a lesion location circuit connected to said image acquisition device;
a dense portion processing circuit connected to said lesion location circuit;
a Hough spectrum analysis circuit connected to said lesion location circuit and said dense portion processing circuit;
a lesion extraction circuit connected to said Hough spectrum analysis circuit;
a feature extraction circuit connected to said lesion extraction circuit; and
a lesion detection circuit connected to said feature analysis circuit.

43. A system as recited in claim 42, comprising:
a lesion location superimposing circuit connected to said lesion detection circuit; and
an image display connected to said lesion location superimposing circuit.

44. A system as recited in claim 42, wherein said image acquisition device is a mammogram acquisition device.

* * * * *

UNITED STATES PATENT AND TRADEMARK OFFICE
CERTIFICATE OF CORRECTION

PATENT NO. : 5,657,362
DATED : August 12, 1997
INVENTOR(S) : Maryellen L. Giger; Ming Zhing; Ping Lu It is certified that error appears in the above-identified patent and that said Letters Patent is hereby corrected as shown below:

On the title page, Col. 1, line 6, insert the following:

The present invention was made in part with U.S. Government support under grant numbers CA48985 (National Institute of Health), DAMD17-93-J-3021 (Army Research Office), and FRA-390 (American Cancer Society). The Government has certain rights in the invention.

Signed and Sealed this

Twenty-second Day of June, 1999

Attest:

Q. TODD DICKINSON

*Attesting Officer*    *Acting Commissioner of Patents and Trademarks*